United States Patent
Mizusawa

(10) Patent No.: US 10,749,586 B2
(45) Date of Patent: Aug. 18, 2020

(54) TERMINAL DEVICE, WIRELESS COMMUNICATION DEVICE, AND COMMUNICATION METHOD

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/773,098

(22) PCT Filed: Sep. 15, 2016

(86) PCT No.: PCT/JP2016/077347
§ 371 (c)(1),
(2) Date: May 2, 2018

(87) PCT Pub. No.: WO2017/086011
PCT Pub. Date: May 26, 2017

(65) Prior Publication Data
US 2018/0323848 A1    Nov. 8, 2018

(30) Foreign Application Priority Data

Nov. 17, 2015  (JP) .................................. 2015-224845

(51) Int. Cl.
*H04B 7/06*    (2006.01)
*H04B 7/10*    (2017.01)
(Continued)

(52) U.S. Cl.
CPC ............. *H04B 7/0626* (2013.01); *H04B 7/04* (2013.01); *H04B 7/0452* (2013.01);
(Continued)

(58) Field of Classification Search
CPC .. H04B 7/0626; H04B 7/0617; H04B 7/0452; H04B 7/04; H04B 7/10; H04W 16/28; H04W 24/10
See application file for complete search history.

(56) References Cited

U.S. PATENT DOCUMENTS

| | | | | |
|---|---|---|---|---|
| 2007/0243878 A1* | 10/2007 | Taira | ...................... | H04B 7/024 455/450 |
| 2008/0144737 A1* | 6/2008 | Naguib | .................. | H04B 7/063 375/299 |

(Continued)

FOREIGN PATENT DOCUMENTS

| | | |
|---|---|---|
| CN | 104938012 A | 9/2015 |
| CN | 105052049 A | 11/2015 |

(Continued)

OTHER PUBLICATIONS

International Search Report and Written Opinion of PCT Application No. PCT/JP2016/077347, dated Nov. 29, 2016, 10 pages of ISRWO.

*Primary Examiner* — Vinncelas Louis
(74) *Attorney, Agent, or Firm* — Chip Law Group

(57) ABSTRACT

A terminal device including a control unit that makes a measurement report associated with antenna ports, for reception strength of a weighted reference signal which is allocated to each of the antenna ports of a base station in a connected state and which is to be beamformed from the base station, for each of one or more antenna ports.

20 Claims, 22 Drawing Sheets

(51) Int. Cl.
*H04W 24/10* (2009.01)
*H04W 16/28* (2009.01)
*H04B 7/04* (2017.01)
*H04B 7/0452* (2017.01)

(52) U.S. Cl.
CPC ............ *H04B 7/0617* (2013.01); *H04B 7/10* (2013.01); *H04W 16/28* (2013.01); *H04W 24/10* (2013.01)

(56) References Cited

U.S. PATENT DOCUMENTS

| | | | |
|---|---|---|---|
| 2009/0110087 A1* | 4/2009 | Liu | H04L 1/0021 375/260 |
| 2013/0258964 A1* | 10/2013 | Nam | H04W 72/046 370/329 |
| 2014/0241274 A1 | 8/2014 | Lee et al. | |
| 2015/0229342 A1 | 8/2015 | Furuskog et al. | |
| 2015/0236774 A1 | 8/2015 | Son et al. | |
| 2016/0150547 A1* | 5/2016 | Ali | H04W 72/1294 370/252 |
| 2016/0218786 A1 | 7/2016 | Mizusawa | |
| 2017/0264405 A1* | 9/2017 | Gao | H04B 7/04 |
| 2018/0062722 A1* | 3/2018 | Su | H04B 7/06 |

FOREIGN PATENT DOCUMENTS

| | | |
|---|---|---|
| CN | 105557049 A | 5/2016 |
| EP | 2773051 A2 | 9/2014 |
| EP | 3051906 A1 | 8/2016 |
| JP | 2015-109692 A | 6/2015 |
| JP | 2015-185954 A | 10/2015 |
| JP | 2015-185956 A | 10/2015 |
| JP | 2015-530847 A | 10/2015 |
| JP | 2016-512006 A | 4/2016 |
| KR | 10-2014-0108793 A | 9/2014 |
| KR | 10-2015-0063129 A | 6/2015 |
| KR | 10-2015-0098324 A | 8/2015 |
| KR | 10-2016-0059480 A | 5/2016 |
| WO | 2014/051506 A1 | 4/2014 |
| WO | 2014/133280 A1 | 9/2014 |
| WO | 2015/045658 A1 | 4/2015 |
| WO | 2015/126159 A1 | 8/2015 |
| WO | 2015/141070 A1 | 9/2015 |
| WO | 2015/141072 A1 | 9/2015 |

\* cited by examiner

FIG. 7

| TM | No of CW | No of Layers | No of Tx | No of Rx | DCI Format | Reference Signal (Antenna Port) | | | |
|---|---|---|---|---|---|---|---|---|---|
| | | | | | | Control CH | PDSCH | CSI Meas | UE Specific |
| TM1 | 1 | 1 | 1 | 1 | 1,1A | p0 | p0 | p0 | N/A |
| TM2 | 1 | 2 | 2 | 2 | 1,1A | p0,p1 | p0,p1 | p0,p1 | N/A |
| | | | 4 | 2 | 1,1A | p0,p1,p2,p3 | p0,p1,p2,p3 | p0,p1,p2,p3 | N/A |
| TM3 | 1 | | 2 | 2 | 1A | p0,p1 | p0,p1 | p0,p1 | N/A |
| | | | 4 | 2 | 1A | p0,p1,p2,p3 | p0,p1,p2,p3 | p0,p1,p2,p3 | N/A |
| | 2 | | 2 | 2 | 2A | p0,p1 | p0,p1 | p0,p1 | N/A |
| | | | 4 | 2 | 2A | p0,p1,p2,p3 | p0,p1,p2,p3 | p0,p1,p2,p3 | N/A |
| TM4 | 1 | 1 | 1 | 1 | 1A | p0 | p0 | p0 | N/A |
| | | 2 | 2 | 2 | 2 | p0,p1 | p0,p1 | p0,p1 | N/A |
| | | 4 | 4 | 2 | 2 | p0,p1,p2,p3 | p0,p1,p2,p3 | p0,p1,p2,p3 | N/A |
| | 2 | | 2 | 2 | 2 | p0,p1 | p0,p1 | p0,p1 | N/A |
| | | | 4 | 2 | 2 | p0,p1,p2,p3 | p0,p1,p2,p3 | p0,p1,p2,p3 | N/A |
| TM5 | 1 | 1 | 2 | 2 | 1D | p0,p1 | p0,p1 | p0,p1 | N/A |
| | | 2 | 2 | 2 | 1A | p0,p1 | p0,p1 | p0,p1 | N/A |
| | | 1 | 4 | 2 | 1A,1D | p0,p1,p2,p3 | p0,p1,p2,p3 | p0,p1,p2,p3 | N/A |
| | | 4 | 4 | 2 | 1A,1D | p0,p1,p2,p3 | p0,p1,p2,p3 | p0,p1,p2,p3 | N/A |
| TM6 | 1 | | 2 | 2 | 1A,1B | p0,p1 | p0,p1 | p0,p1 | N/A |
| | | | 4 | 2 | 1A,1B | p0,p1,p2,p3 | p0,p1,p2,p3 | p0,p1,p2,p3 | N/A |
| TM7 | 1 | 1 | 1 | 1 | 1 | p0 | p5 | ? | p5 |
| | | 1 | 2 | 2 | 1 | p0,p1 | p5 | ? | p5 |
| | | 1 | 4 | 2 | 1 | p0,p1,p3,p4 | p5 | ? | p5 |
| | | 2 | 2 | 2 | 1A | p0,p1 | p0,p1 | p0,p1 | N/A |
| | | 4 | 4 | 2 | 1A | p0,p1,p3,p4 | p0,p1,p3,p4 | p0,p1,p3,p4 | N/A |
| TM8 | 1 | 1 | 2 | 2 | 2B | p0 | p7 or p8 | ? | p7 or p8 |
| | | 2 | 2 | 2 | 1A | p0,p1 | p7 or p8 | ? | p7 or p8 |
| | | 4 | 4 | 2 | 1A | p0,p1,p3,p4 | p7 or p8 | ? | p7 or p8 |
| | 2 | | 2 | 2 | 2B | p0,p1 | p7,p8 | ? | p7,p8 |
| | | | 4 | 2 | 2B | p0,p1,p3,p4 | p7,p8 | ? | p7,p8 |
| TM9 | 1 | | 2 | 2 | 1A | p0,p1 | p0,p1 | p0,p1 | N/A |
| | 2 | 2 | 2 | 2 | 2C | p0,p1 | p7,p8 | p15,p16 | p7,p8 |
| | | 4 | 4 | 2 | 2C | p0,p1 | p7,p8 | p15,p16,p17,p18 | p7,p8 |
| | | 8 | 8 | 2 | 2C | p0,p1,p3,p4 | p7,p8 | p15,p16,p17,p18 p19,p20,p21,p22 | p7,p8 |

TERMINAL DEVICE, WIRELESS COMMUNICATION DEVICE, AND COMMUNICATION METHOD

CROSS REFERENCE TO RELATED APPLICATIONS

This application is a U.S. National Phase of International Patent Application No. PCT/JP2016/077347 filed on Sep. 15, 2016, which claims priority benefit of Japanese Patent Application No. JP 2015-224845 filed in the Japan Patent Office on Nov. 17, 2015. Each of the above-referenced applications is hereby incorporated herein by reference in its entirety.

TECHNICAL FIELD

The present disclosure relates to a terminal device, a wireless communication device, and a communication method.

BACKGROUND ART

The improvement of wireless access performance is urgently needed due to a recent sharp increase in data traffic. It is considered to overlay and dispose macro cells, which use relatively low frequencies in the ultra-high frequency (UHF) band, and small cells, which use relatively high frequencies, in order to build a high-speed and large-capacity wireless access network. Full-dimension (FD) multi-input multi-output (MIMO), which compensates for high propagation losses, is considered for small cells, which use high frequency bands. FD-MIMO is a technique of two-dimensionally disposing base station antennas in the horizontal and vertical directions for MIMO communication (For example, see Patent Literature 1).

CITATION LIST

Patent Literature

Patent Literature 1: JP 2015-109692A

DISCLOSURE OF INVENTION

Technical Problem

In FD-MIMO, in order to address overhead upon transmission of a number of reference signals, increase in processing at a base station and a terminal, increase in cost of a wireless device at the base station, or the like, employment of an FD-MIMO configuration in a sub array scheme and a beamformed reference signal, or the like, is studied.

It is expected that beamforming provides an effect of improving signal power at a receiving end and improving communication quality by narrowing a beam width, and an effect of improving cell throughput by multiplexing users among a plurality of beams of different directions. However, if there is interference among beams, data allocated to the same resource interferes among beams, which lowers communication quality, and it becomes impossible to secure a sufficient number of users to be multiplexed.

Therefore, the present disclosure proposes new and improved terminal device, wireless communication device and communication method which can effectively reduce interference among beams in FD-MIMO.

Solution to Problem

According to the present disclosure, there is provided a terminal device including: a control unit configured to make a measurement report associated with antenna ports, for reception strength of a weighted reference signal which is allocated to each of the antenna ports of a base station in a connected state and which is to be beamformed from the base station, for each of one or more antenna ports.

In addition, according to the present disclosure, there is provided a base station including: a transmitting unit configured to allocate a weighted reference signal to each of antenna ports, and beamform and transmit the allocated weighted reference signal; and an acquisition unit configured to acquire a measurement report associated with the antenna ports for reception strength of the reference signal from a terminal device in a connected state for each of the one or more antenna ports.

In addition, according to the present disclosure, there is provided a communication method including: making a measurement report associated with antenna ports, for reception strength of a weighted reference signal which is allocated to each of the antenna ports of a base station in a connected state and which is to be beamformed from the base station, for each of one or more antenna ports.

In addition, according to the present disclosure, there is provided a communication method including: allocating a weighted reference signal to each of antenna ports, and beamforming and transmitting the allocated weighted reference signal; and acquiring a measurement report associated with the antenna ports for reception strength of the reference signal from a terminal device in a connected state for each of the one or more antenna ports.

Advantageous Effects of Invention

As described above, according to the present disclosure, it is possible to provide new and improved terminal device, wireless communication device and communication method which can effectively reduce interference among beams in FD-MIMO.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 illustrates an example of correspondence of reference signals and antenna ports relating to each Transmission mode.

MODE(S) FOR CARRYING OUT THE INVENTION

Figure 1:
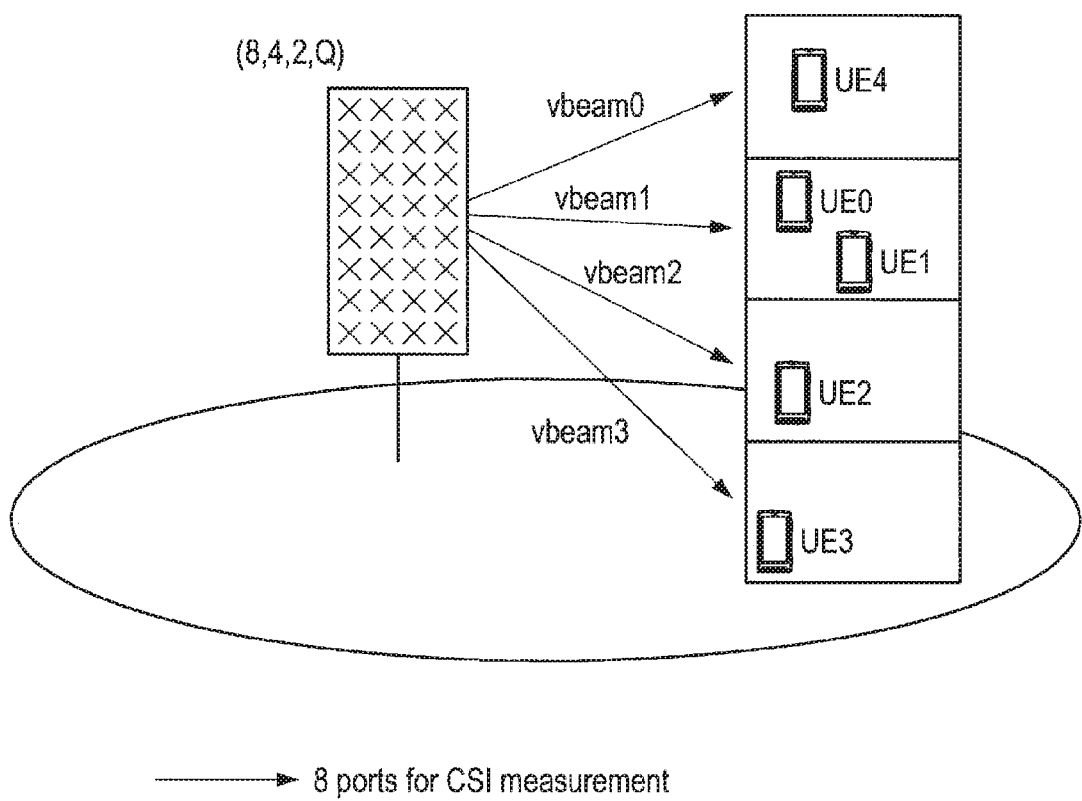
FIG. 1 is an explanatory diagram illustrating a usage example of FD-MIMO.

Hereinafter, a preferred embodiment of the present disclosure will be described in detail with reference to the appended drawings. Note that, in this specification and the appended drawings, constituent elements that have substantially the same function and structure are denoted with the same reference numerals, and repeated explanation of these constituent elements is omitted.

Note that description will be provided in the following order.

Note that description will be provided in the following order.

1. Embodiment of present disclosure
1.1. Background
1.2. Configuration Examples
1.2.1. Configuration example of communication system
1.2.2. Configuration example of terminal device
1.2.3. Configuration example of base station
1.2.4. Configuration example of control entity
1.3. Operation examples
2. Application examples
3. Conclusion Recent wireless communication environments have been confronted with a sharp increase in data traffic. The improvement of wireless access performance is then urgently needed due to a sharp increase in data traffic. It is considered to overlay and dispose macro cells, which use relatively low frequencies in the ultra-high frequency (UHF) band, and small cells, which use relatively high frequencies, in order to build a high-speed and large-capacity wireless access network. Full-dimension (FD) multi-input multi-output (MIMO), which compensates for high propagation losses, is considered for small cells, which use high frequency bands. FD-MIMO is a technique of two-dimensionally disposing base station antennas in the horizontal and vertical directions for MIMO communication.

FD-MIMO enables a sharp beam to be directed to upper floors of a building by an array antenna in which a number of antenna elements are two-dimensionally disposed, and a use case is also studied which improves coverage of the building by the use of a beam sectored for each tilt angle, or the like. FIG. 1 is an explanatory diagram illustrating a usage example of FD-MIMO. In FIG. 1, an example of a use case is illustrated which improves coverage of a building by emitting beams in four directions toward the building and improving reception efficiency of terminals (user equipment; UE) located within the building.

In FD-MIMO in which a sharp beam is formed to transmit a signal using an array antenna configured with a number of antenna elements, employment of a configuration of FD-MIMO in a sub array scheme and a beamformed reference signal, or the like, is studied in order to address overhead upon transmission of a number of reference signals, increase in processing at a base station and a terminal, increase in cost of a wireless device at the base station, or the like.

The base station beamforms a CSI-RS and transmits the beamformed CSI-RS using cell specific weighting matrices allocated for each sub array. It is then studied that a cell specific beam is allocated to a terminal which detects the beamformed CSI-RS and data to the terminal is multiplied by the cell specific weighting matrices and transmitted. Further, it becomes possible to allocate a plurality of cell specific beams to a terminal which detects a plurality of CSI-RSs. By the terminal reporting a channel estimation result using a plurality of beamformed CSI-RSs to the base station as a channel state report, the base station can generate a terminal specific weighting matrix for each terminal, multiply data to the terminal by the terminal specific weighting matrix and a plurality of cell specific weighting matrices and transmit the multiplied data, so that the base station can provide a beam sharper than the cell specific beam and provide more favorable communication quality and a higher data rate.

FD-MIMO includes quite a large number of antenna elements in an antenna array. It is then considered to simplify a baseband (BB) circuit and decrease the cost of a wireless device by installing a fixed analog phase shifter between a transceiver unit (TXRU) that supplies signals to antenna elements and each antenna element (see 3GPP TR36.897 v0.1.1). Further, installing a fixed analog phase shifter between a transceiver unit (TXRU) that supplies signals to antenna elements and each antenna element limits the size of a weighting matrix for adjusting a sharp beam for each user while maintaining the sharp beam, and requires lighter processing than adjusting the weighting factors of all the antenna elements.

Figure 2:
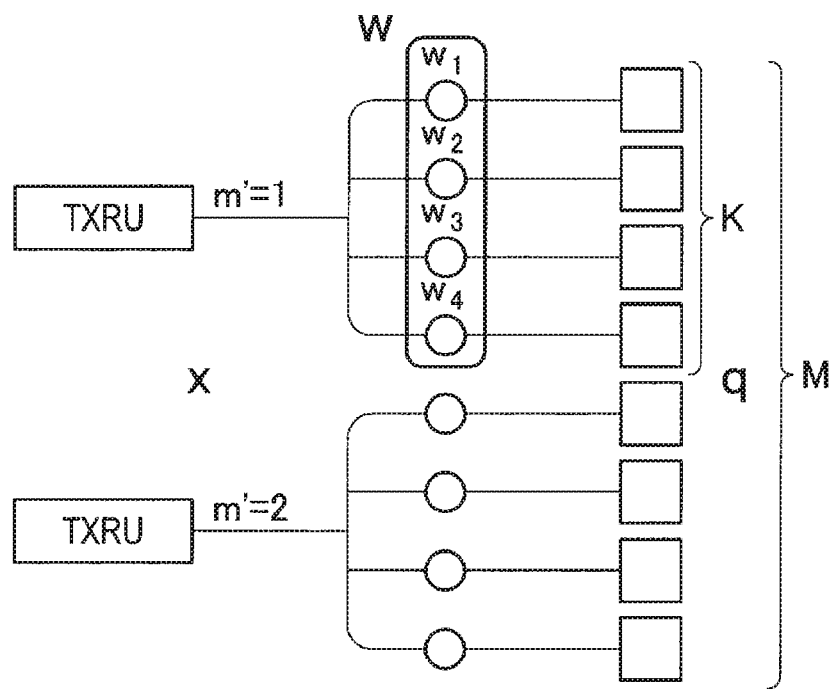
FIG. 2 is an explanatory diagram illustrating a connection example of TXRUs.

FIG. 2 is an explanatory diagram illustrating a connection example of the TXRUs. For example, in an antenna array configured with M×N antenna elements, in the case where M antenna elements in a vertical direction are divided into sub arrays and connected to the TXRUs, if the number of TXRUs in the vertical direction is $M_{TxRu}$, the total number of TXRUs becomes $M_{TXRU} \times N$. If a tilt angle of a beam emitted from the TXRU is $\theta_{etilt}$, w between the TXRU and the antenna element can be expressed with the following equation 1.

[Math. 1]

$$w_k = \frac{1}{\sqrt{K}} \exp\left(-j\frac{2\pi}{\lambda}(k-1)d_v\cos\theta_{etilt}\right) \text{ for } k = 1, \ldots, K \quad \text{(equation 1)}$$

Figure 3:
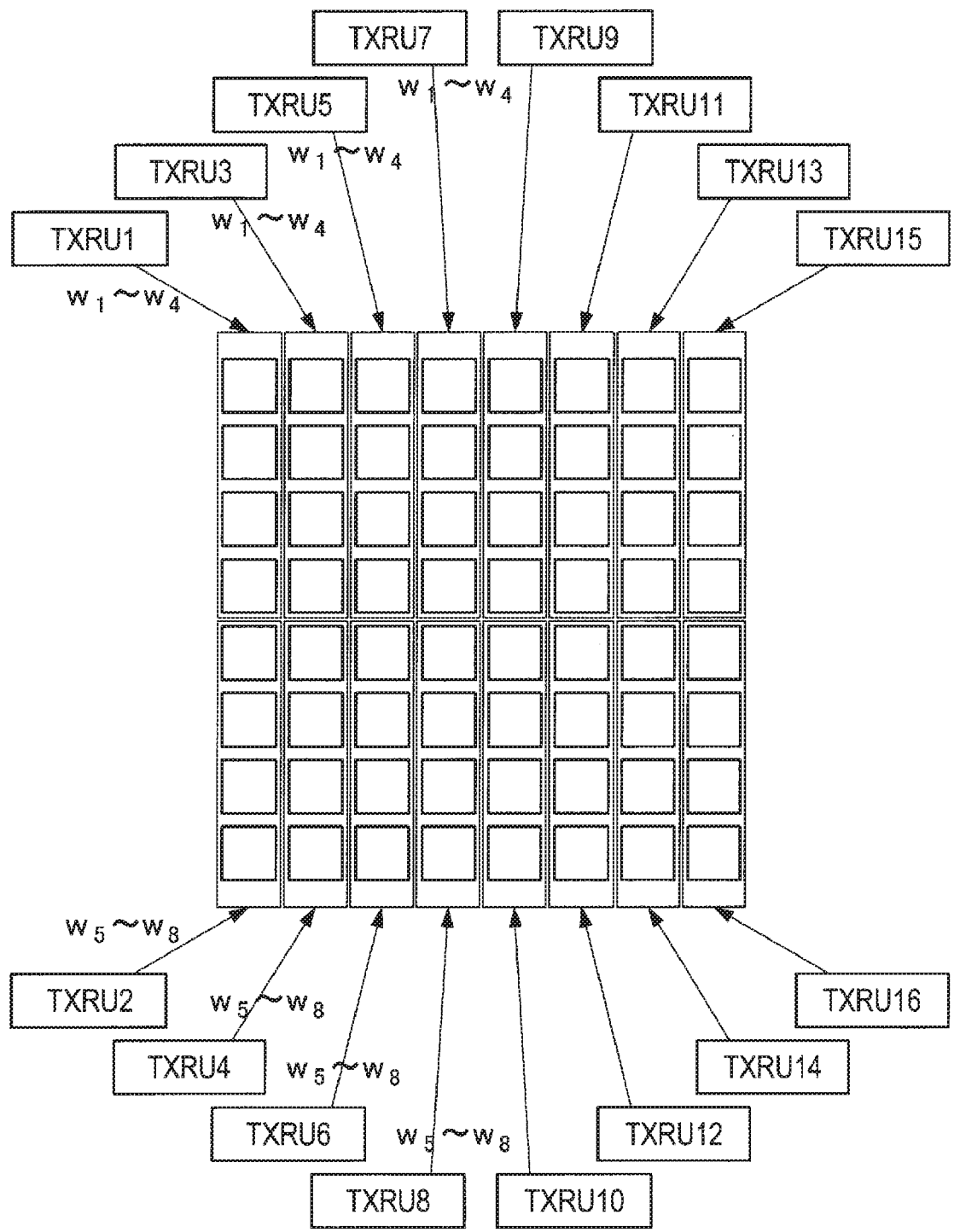
FIG. 3 is an explanatory diagram illustrating a configuration example of an antenna array configured with 64 elements and an antenna array configured with 16 TXRUs.

FIG. 3 is an explanatory diagram illustrating a configuration example of an antenna array configured with 64 elements and an antenna array configured with 16 TXRUs. The 16 TXRUs are connected to 16 sub arrays one to one via cell specific weighting matrices. Two sub arrays and TXRUs are disposed in the vertical direction. Weighting factors $W_1$ to $W_4$ and $W_5$ to $W_8$ used by two TXRUs in the vertical direction are different, and beams are generated in different directions. Eight sub arrays and TXRUs are disposed in the horizontal direction (column direction). These eight TXRUs in the horizontal direction use the same weighting matrix, and generate beams in the same direction.

Figure 4:
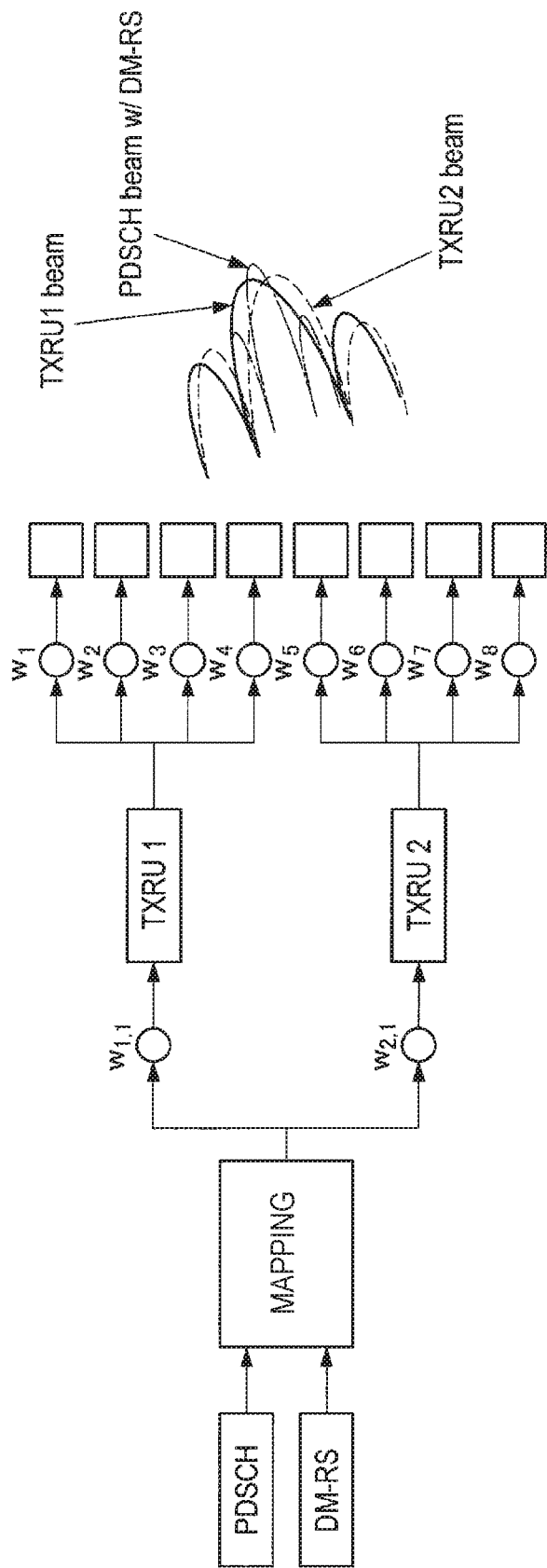
FIG. 4 is an explanatory diagram illustrating an example where a sharp PDSCH beam is generated using cell specific weighting matrices and a terminal specific weighting matrix.

FIG. 4 is an explanatory diagram illustrating an example where sharp physical downlink shared channel (PDSCH) beams are generated by cell specific weighing matrices and a terminal specific weighting matrix. The base station 200 maps PDSCHs and DM-RSs (demodulation reference signals) to resource elements, provide terminal specific weighting factors $W_{1,1}, W_{2,1}, W_{2,2}, W_{1,3}, W_{2,3}, W_{1,4}, W_{2,4}, W_{1,5}, W_{2,5}, W_{1,6}, W_{2,6}, W_{1,7}, W_{2,7}, W_{1,8},$ and $W_{2,8}$, and respectively emit beams from 16 sub arrays via TXRU 1 to TXRU 16.

Figure 5:
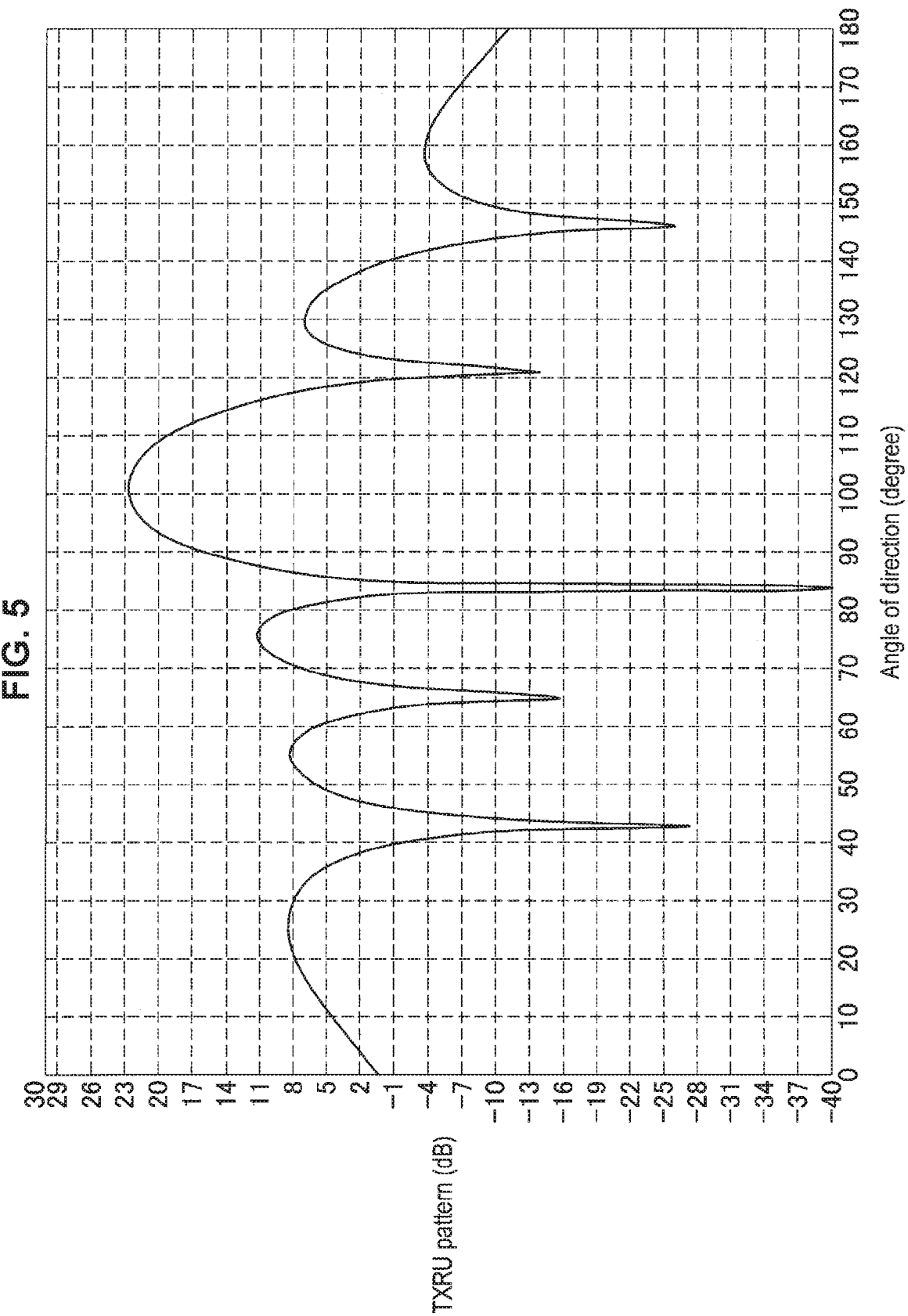
FIG. 5 is an explanatory diagram illustrating an example of a beam pattern emitted from TXRUs.
Figure 6:
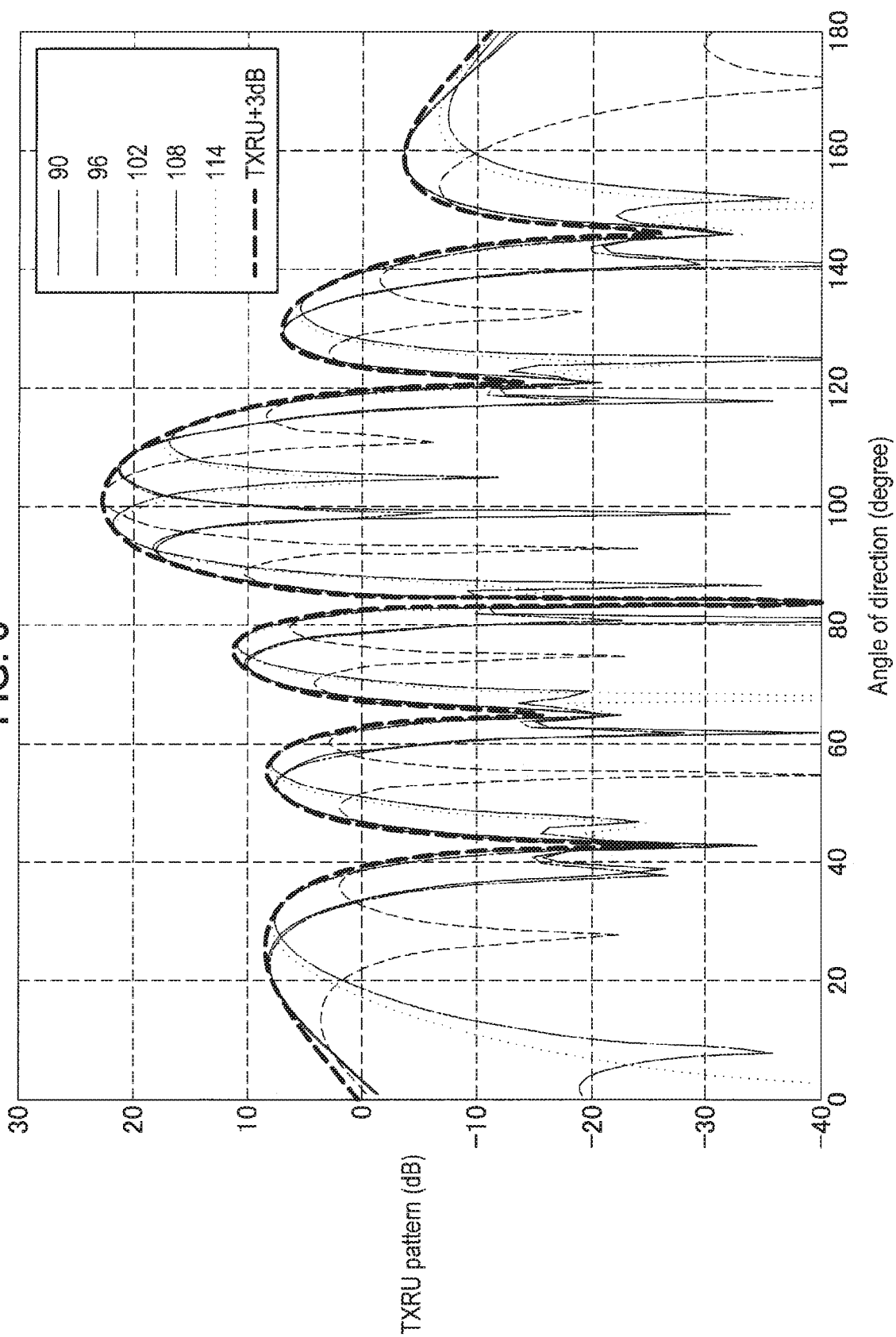
FIG. 6 is an explanatory diagram illustrating an example of a PDSCH beam.

FIG. 5 is an explanatory diagram illustrating an example of a beam pattern emitted from TXRUs in the case where $M_{TXRU}=2$ in an antenna array configured with 64 elements of M=8 and N=8. FIG. 6 is an explanatory diagram illustrating an example of a beam of a PDSCH. If a pre-weight for inserting an appropriate weight into each TXRU is disposed, the beam of the PDSCH becomes sharp as illustrated in FIG. 6. For example, the base station can estimate an angle of a terminal from a sounding reference signal (SRS) transmitted from the terminal and can adjust a pre-weight to be disposed in the preceding stage of the TXRU so that the beam of the PDSCH faces an optimum direction.

(Reference Signal for Channel Estimation in Related Art)

A channel state information reference signal (CSI-RS) is a reference signal for estimating a channel in downlink, such as for determination of a modulation scheme and determination of an antenna weighting factor of MIMO and beam-forming. The terminal receives a CSI-RS from the base station and reports the channel estimation result to the base station as a channel state report in accordance with reception of the CSI-RS. Antenna ports 15 to 22 are used in accordance with the number of reference signals (1, 2, 4, 8) which form the CSI-RS.

The terminal is notified of antenna ports to which the CSI-RS is to be transmitted, a position of a resource element into which the CSI-RS is to be inserted, information relating to a subframe into which the CSI-RS is to be inserted, or the like, using a CSI Reference Signal Configuration (CSI-RS configuration information) notified through RRC signaling.

The CSI reference signal configuration includes an Antenna Port Count, a CSI reference Signal Configuration, a Subframe configuration, or the like.

The Antenna Port Count indicates the number of antenna ports (1, 2, 4 or 8) forming the CSI-RS.

The CSI reference Signal configuration is indicated with a value from 0 to 31, and a resource element (k, l) and a time slot to be used by the CSI-RS are determined from a look-up table defined in 3GPP TS36.211 table 6.10.5.2-1, or the like. In a case of 8 antenna ports, resource elements of antenna ports 15 and 16 are defined in the look-up table, and frequency offset values of resource elements to be used by other antenna ports are as indicated in Table 1.

TABLE 1

(Frequency offset values of resource elements)

| Antenna Ports | Normal Cyclic Prefix | Extended Cyclic Prefix |
|---|---|---|
| 15, 16 | 0 | 0 |
| 17, 18 | −6 | −3 |
| 19, 20 | −1 | −6 |
| 21, 22 | −7 | −9 |

The Subframe configuration is indicated with a value from 0 to 154, and CSI-RS periodicity and a CSI-RS subframe offset are provided from a look-up table defined in 3GPP TS36.211 table 6.10.5.3-1. In a resource 12, up to three CSI Reference Signal configurations can be allocated to the terminal.

(CSI Reporting Mode and Transmission Mode in Related Art)

Types of the channel state report include whether Periodic (periodic) or Aperiodic (aperiodic), whether wideband or sub-band, and whether or not a report of precoding matrix indicator (PMI) is necessary. The channel state report is distinguished as a CSI reporting mode. The CSI reporting mode is indicated in CQI-Report Config signaled to the terminal in an RRC message.

A timing of the channel state report is triggered by, for example, a CSI Request by DCI format 0 and 4 on a physical downlink control channel (PDCCH) in a case of Aperiodic CSI reporting. The terminal which receives the CSI Request from the base station using a frequency division duplex (FDD) scheme transmits a CSI report four subframes after the CSI request is received.

Further, as the timing of the channel state report, a period of Reporting is signaled to the terminal in the RRC message as a CQI-PMI Configuration Index in a case of Periodic CSI reporting.

The channel state report from the terminal is made in a form in which channel quality indicators (CQI), PMI, pre-coding type indicators (PTI), and rank indicators (RI) are included in uplink control information (UCI) in response to a request from the base station.

Resources of a plurality of types of CSI-RSs, timings of a plurality of reports, or the like, can be set for each CSI-Process. The CSI Reference Signal Configuration and the CQI-PMI Configuration Index are associated with a CSI-Process ID.

The base station notifies a terminal in an RRC_CONNECTED state of a downlink transmission mode through RRC signaling in accordance with a method of transmitting data to the terminal. Table 2 is an explanatory diagram indicating an example of the transmission mode.

TABLE 2

(Example of transmission mode)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0: otherwise transmit diversity |
| 8 | If the UE is configured without PMI/RI reporting: if the number of PBCH antenna ports is one, single-antenna port, port 0: otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0: otherwise transmit diversity<br>If the UE is configured with PMI/RI reporting: if the number of CSI-RS ports is one, single-antenna port, port 7: otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7: otherwise transmit diversity<br>If a CSI process of the UE is configured with PMI/RI reporting: if the number of CSI-RS ports is one, single-antenna port, port 7: otherwise up to 8 layer transmission, ports 7-14 (see subclause 7.1.5B) |

FIG. 7 illustrates an example of correspondence of reference signals and antenna ports relating to each transmission mode. In Transmission mode 9, MIMO up to 8×8 is supported for one UE, dual layer beamforming is supported for two UEs at the same time, or single layer beamforming is supported for four UEs at the same time. In the case where eight layers are used, while a CSI-RS is transmitted using eight antenna ports of antenna ports 15 to 22, because the terminal does not need to know physical antenna elements or weighting matrices to be used for beamforming, only one antenna port is allocated to one code word in transmission of a PDSCH, and notification of relationship between antennas which transmit the PDSCH and antenna ports to which a CSI-RS is to be transmitted is not made.

It is expected that beamforming provides an effect of improving signal power at a receiving end and improving communication quality by narrowing a beam width, and an effect of improving cell throughput by multiplexing users among a plurality of beams of different directions. However, if there is interference among beams, data allocated to the same resource interferes among beams, which lowers communication quality, and it becomes impossible to secure a sufficient number of users to be multiplexed. Because, in FD-MIMO, it is tried to cover a high building, or the like, using a plurality of sharp beams with a slight angular difference being provided, it is important to control interference among beams.

As a model of an interference wave causing interference among beams, there can be mainly two cases of interference within the base station and interference between base stations.
(1) Interference Due to Reflected Waves and Side Lobes of Other Beams Within the Same Base Station
(2) Interference Due to a Beam of an Adjacent Base Station Because a high frequency band like a millimeter wave has strong straightness, the high frequency band is largely affected by side lobes compared to reflected waves.

Figure 8:
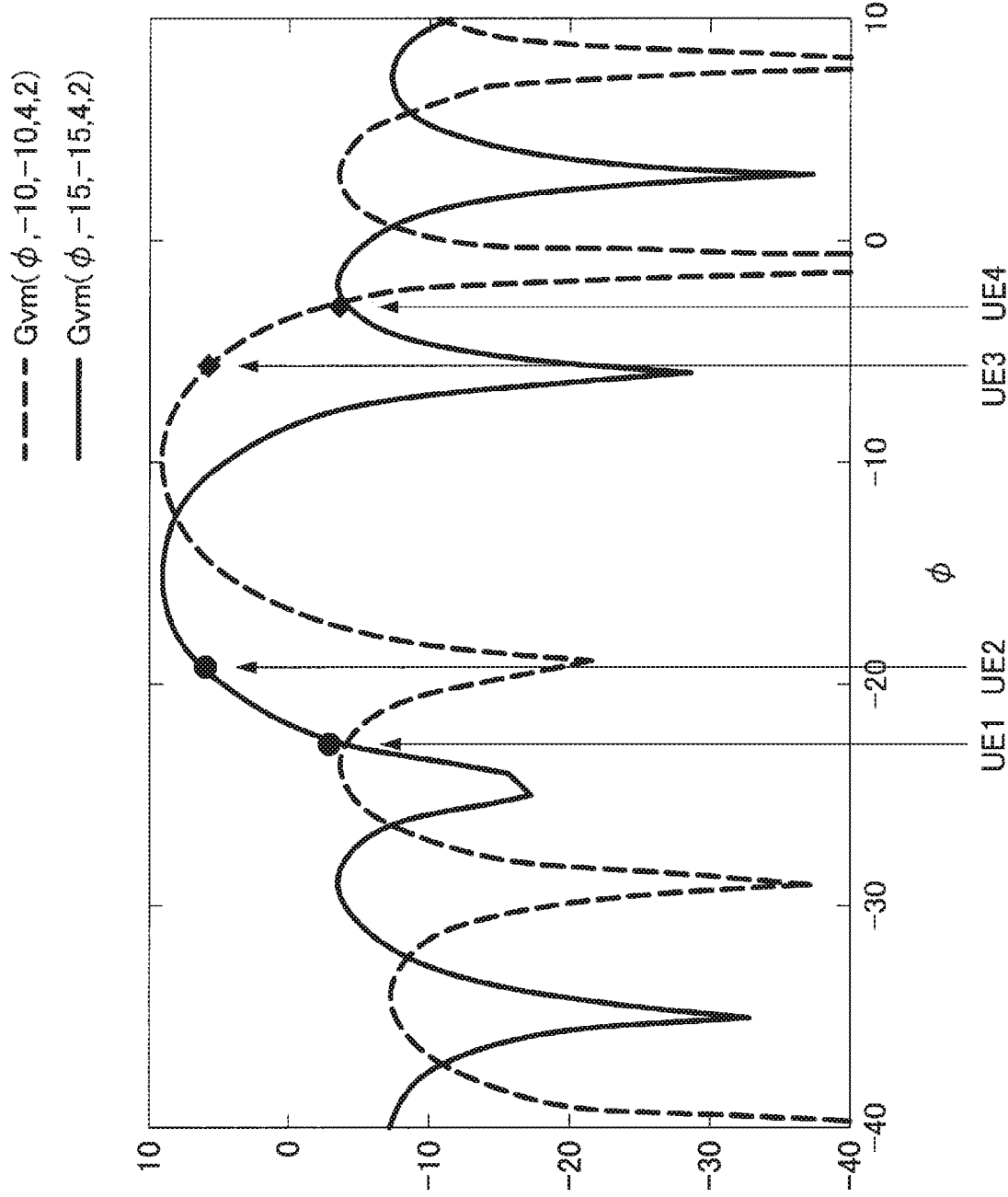
FIG. 8 is an explanatory diagram illustrating an example of interference among beams due to influence of side lobe.

FIG. 8 is an explanatory diagram illustrating an example of interference among beams due to influence of side lobes. PDSCH data of UE 1 and UE 2 is beamformed and transmitted with a cell specific beam 1, and PDSCH data of UE 3 and UE 4 is beamformed and transmitted with a cell specific beam 2. The UE 1 and the UE 4 receive large interference from other cell specific beams.

Figure 9:
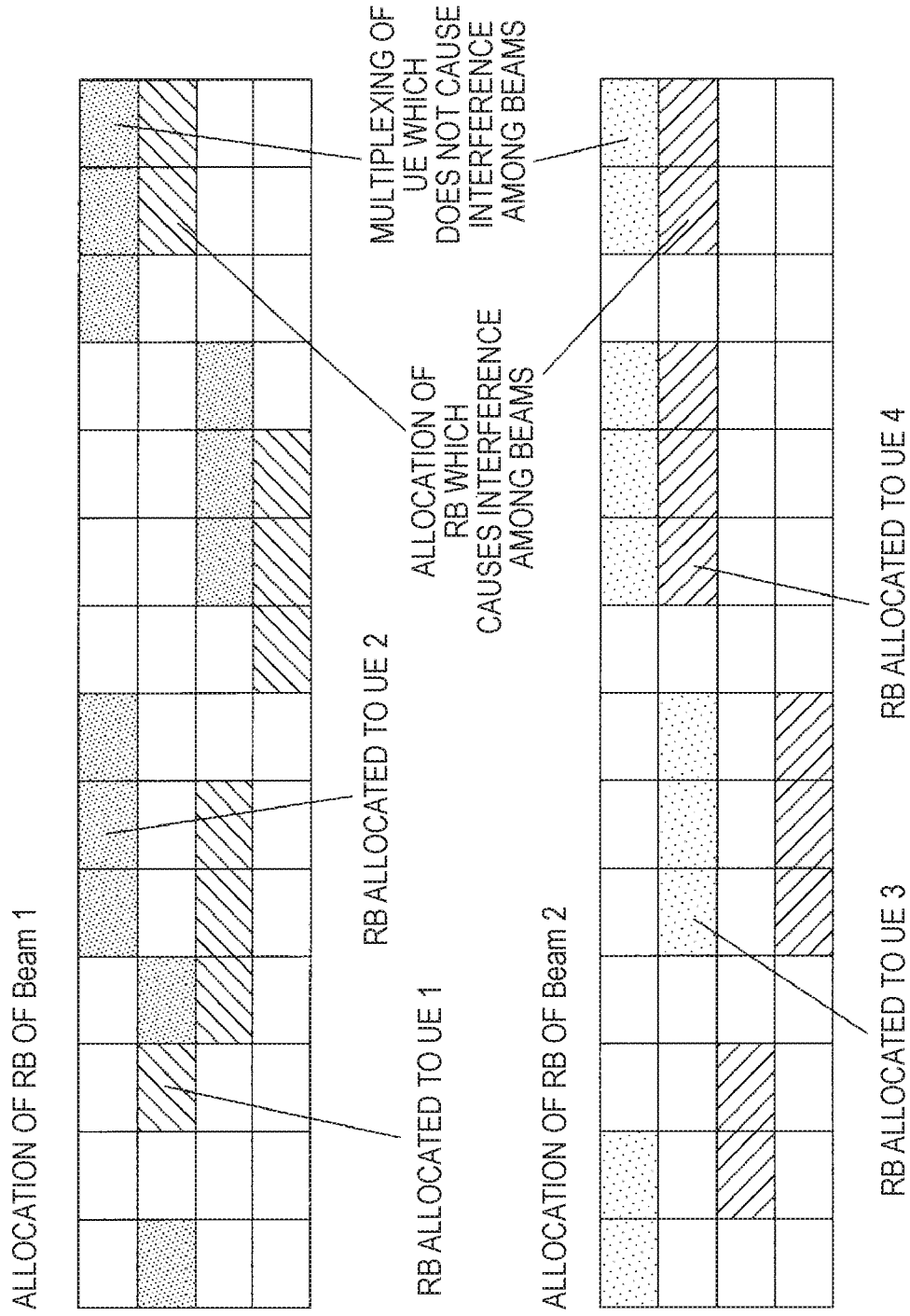
FIG. 9 is an explanatory diagram illustrating an example of allocation of user data to a cell specific beam.

FIG. 9 is an explanatory diagram illustrating an example of allocation of user data to a cell specific beam. In the example illustrated in FIG. 9, the UE 2 and the UE 3 can be effectively multiplexed because even if data is allocated to the same resource block, there is little interference. On the other hand, while beams allocated to the UE 1 and the UE 4 are different, if the same resource block is allocated, large interference occurs between the beams.

It is difficult to infer a cause of such interference among beams only from a transmission side because interference also fluctuates in accordance with a communication channel state as well as a carrier frequency, an antenna structure and radio circuit performance. A mechanism in which the terminal measures interference among beams in downlink and notifies the base station, so that the interference is controlled at the base station and between the base stations is required.

Further, in FD-MIMO, it is assumed that beams are directed to upper floors of a building. In the case where beams of FD-MIMO are directed to the same building from a plurality of cells, if the same resource is used by a plurality of beams, large interference occurs. There is no method for reducing interference among beams of FD-MIMO across cells.

That is, a mechanism in which the terminal measures interference among beams in downlink data and notifies the base station, so that the interference is controlled at the base station and between the base stations is required. However, the terminal cannot stably measure interference among beams for the following two reasons in related art.

First, while a cell specific beam and weighting coefficients to be used in a PDSCH beam are allocated for each terminal, the terminal cannot know where a beamformed PDSCH directed to other terminals which can be interference is to be scheduled.

Secondly, while the terminal can measure a beamformed CSI-RS to be transmitted for each cell specific beam (TXRU beam), the terminal does not know with which cell specific beam (TXRU beam) the PDSCH to be transmitted to the terminal is configured. That is, the terminal cannot know which cell specific beam (TXRU beam) is an interference beam. While it is necessary to know an antenna port of a cell specific beam to be used in a PDSCH to know which beam is an interference beam, in related art, an antenna port of the CSI-RS is not associated with an antenna port of the PDSCH to be used in transmission modes (TM 7, 8, 9) of beamforming.

Therefore, in view of the above-described background, the present discloser has studied hard a mechanism in which the terminal measures interference among beams in downlink data and notifies the base station so that the interference is controlled at the base station and between the base stations. As a result, the present discloser has achieved a device of a mechanism in which the terminal measures interference among beams in downlink data and notifies the base station, so that the interference is controlled at the base station and between the base stations.

The background of the embodiment of the present disclosure has been described above. Next, a configuration example of an embodiment of the present disclosure will be described.

1.2. Example of Configuration (1.2.1. Configuration Example of Communication System)

Figure 11:
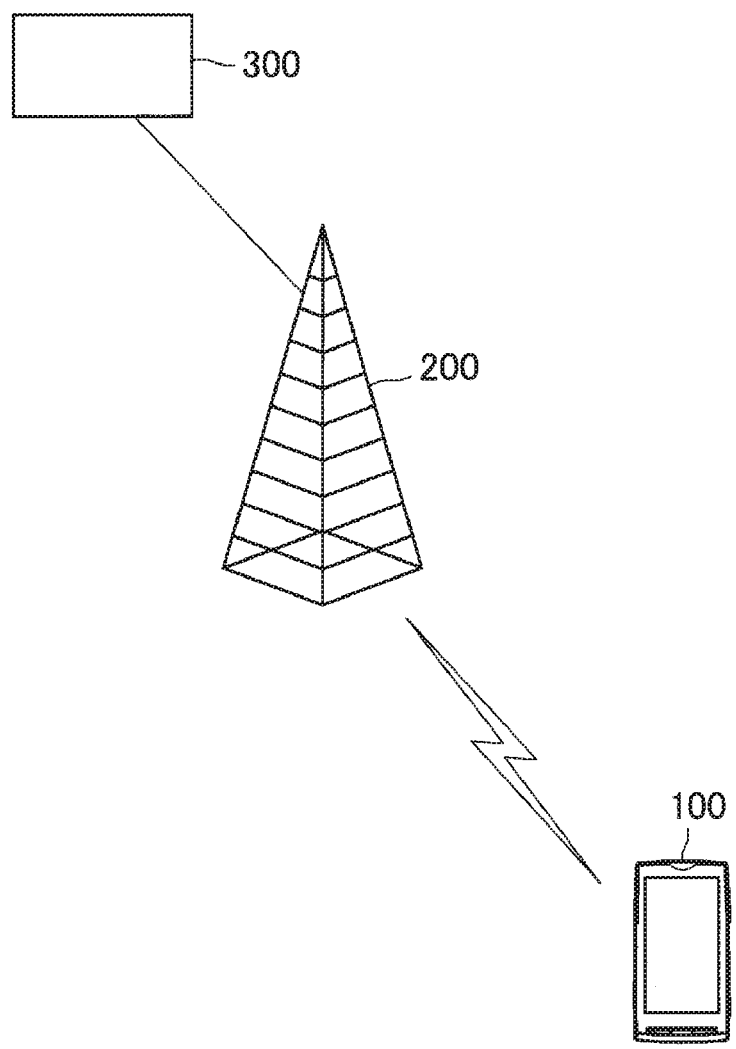
FIG. 11 is an explanatory diagram illustrating an example of a schematic configuration of a communication system 1 according to an embodiment of the present disclosure.

First, the schematic configuration of a communication system 1 according to an embodiment of the present disclosure will be described. FIG. 11 is an explanatory diagram illustrating an example of the schematic configuration of the communication system 1 according to an embodiment of the present disclosure. FIG. 11 illustrates that the communication system 1 includes a terminal device 100, a base station 200, and a control entity 300. The communication system 1 is compliant with, for example, LTE, LTE-Advanced, or a communication scheme equivalent thereto.

The terminal device 100 performs wireless communication with the base station 200. Further, the terminal device 100 performs measurements for cells (such as a serving cell and an adjacent cell). Further, the terminal device 100 reports a measurement (i.e., reports a measurement result) to the base station 200.

The base station 200 performs wireless communication with one or more terminal devices including the terminal device 100. Further, the base station 200 decides the handover of a terminal device on the basis of a measurement result reported by the terminal device. The base station 200 may be a base station in a macro cell (i.e., macro base station) or a base station in a small cell (i.e., small base station).

The control entity 300 performs control according to each embodiment of the present disclosure. For example, the control entity 300 is an existing or a new core network node. Alternatively, the control entity 300 may be a base station. As an example, in a case where the base station 200 is a small base station, the control entity 300 may be a macro base station.

Additionally, for example, the "on-state" of a cell (such as a small cell) means the state in which a base station in the cell transmits and receives signals (data signals and control signals) in the cell in an embodiment of the present disclosure. In contrast, for example, the "off-state" of a cell (such as a small cell) means the state in which a base station in the cell transmits and receives no signals but some control signals (such as DRSs) in the cell. Alternatively, the "off-state" of a cell may mean the state in which a base station in the cell does not transmit or receive any signals.

The example of the schematic configuration of the communication system 1 according to the embodiment of the present disclosure has been described above using FIG. 11. Next, a configuration example of the terminal device 100 according to the embodiment of the present disclosure will be described.

(1.2.2. Configuration Example of Terminal Device)

Figure 12:
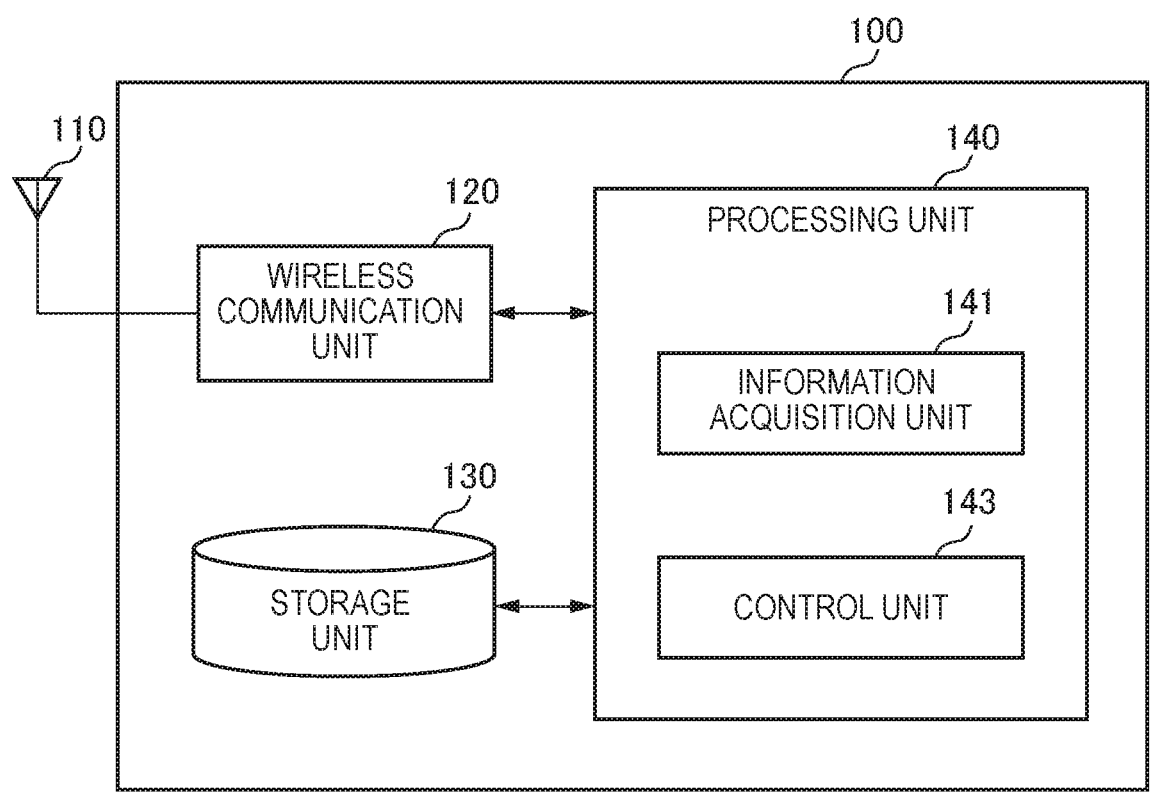
FIG. 12 is a block diagram illustrating an example of a configuration of a terminal device 100 according to the embodiment of the present disclosure.

FIG. 12 is a block diagram illustrating an example of a configuration of the terminal device 100 according to the embodiment of the present disclosure. Referring to FIG. 12, the terminal device 100 includes an antenna unit 110, a wireless communication unit 120, a storage unit 130, and a processing unit 140.

(Antenna unit 110)

The antenna unit 110 emits a signal output by the wireless communication unit 120 to a space as a radio wave. In addition, the antenna unit 110 converts a radio wave in a space into a signal and outputs the signal to the wireless communication unit 120.

(Wireless Communication Unit 120)

The wireless communication unit 120 receives a signal. For example, the wireless communication unit 120 receives a downlink signal from a base station and transmits an uplink signal to a base station.

(Storage Unit 130)

The storage unit 130 temporarily or permanently stores programs and data for operations of the terminal device 100.

(Processing unit 140)

The processing unit 140 provides various functions of the terminal device 100. The processing unit 140 includes an information acquisition unit 141 and the control unit 143. Note that the processing unit 140 can further include other constituent elements in addition to these constituent elements. That is, the processing unit 140 can perform other operations in addition to operations of the constituent elements.

(Information Acquisition Unit 141)

The information acquisition unit 141 acquires various kinds of information from signals acquired from radio waves received by the antenna unit 110. The information acquisition unit 141 acquires beamformed reference signals transmitted from the base station 200 or data placed on data channels in the present embodiment. The information acquisition unit 141 acquires, for example, cell specific beam configuration information. The cell specific beam configuration information may be an antenna port of a cell specific beam included in a PDSCH beam, or information regarding a terminal specific weighting matrix generated by the base station 200.

(Control Unit 143)

The control unit 143 controls operation of the terminal device 100. In the present embodiment, for example, the control unit 143 makes a measurement report associated with an antenna port for reception strength of a weighted reference signal (CSI-RS) which is allocated to each antenna port of the base station in a connected state and which is to be beamformed from the base station 200, for each of one or more antenna ports.

Further, the control unit 143 calculates an estimate value of interference among beams from reception strength of a reference signal of a specific beam of the base station 200 which is allocated to a predetermined channel for a data signal and reception strength of other reference signals. The control unit 143 may transmit a measurement report including the estimate value of the interference among beams to the base station 200 in the case where the calculated estimate value of the interference among beams exceeds a predetermined threshold.

For example, the control unit 143 measures the reference signals transmitted on beams for all the terminal devices from the base station 200, and generates a channel state report on the basis of an instruction from the base station 200. The channel state report reports the state of the channel of each beam. The control unit 143 may also include information of the reception strength of each reference signal for channel estimation when generating a channel state report. Further, the control unit 143 performs measurement including measurement of reception power or reception quality of the CSI-RS relating to the CSI-RS configuration information transmitted from the base station 200 which beamforms a reference signal with a plurality of beams.

The functional configuration example of the terminal device 100 according to an embodiment of the present disclosure has been described above. Next, a functional configuration example of the base station 200 according to an embodiment of the present disclosure will be described.

(1.2.3. Configuration Example of Base Station)

Figure 13:
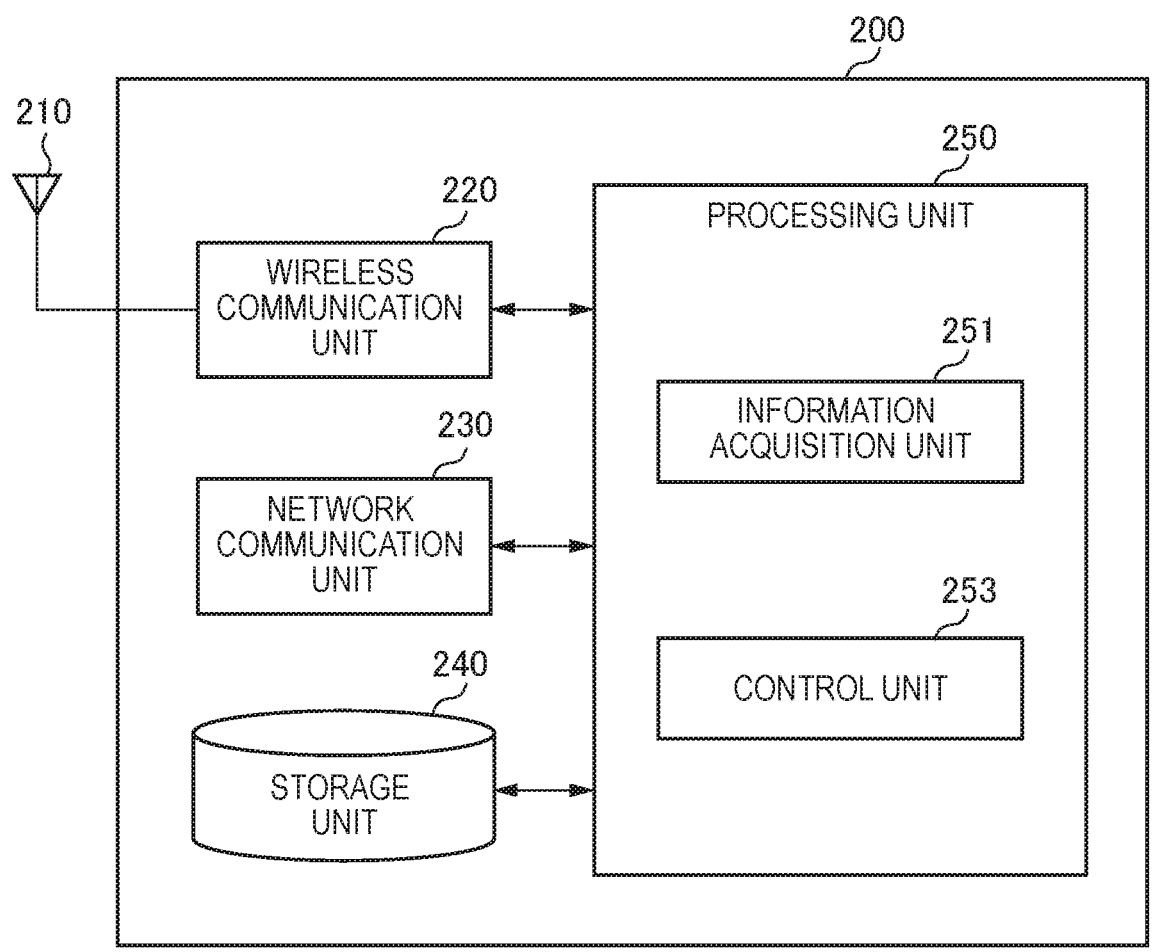
FIG. 13 is a block diagram illustrating a functional configuration example of a base station 200 according to an embodiment of the present disclosure.

FIG. 13 is a block diagram illustrating a functional configuration example of the base station 200 according to an embodiment of the present disclosure. As illustrated in FIG. 13, the base station 200 according to the embodiment of the present disclosure includes an antenna unit 210, a wireless communication unit 220, a network communication unit 230, a storage unit 240, and a processing unit 250.

(Antenna Unit 210)

The antenna unit 210 emits a signal output by the wireless communication unit 220 to a space as a radio wave. In addition, the antenna unit 210 converts a radio wave of a space into a signal and outputs the signal to the wireless communication unit 220.

The antenna unit 210 includes a directional antenna in the present embodiment. For example, the directional antenna is a directional antenna that can be used for FD-MIMO.

For example, 16 TXRUs illustrated in FIG. 3 are connected to 16 sub arrays one to one via one cell specific weighting matrices. Two sub arrays and TXRUs are disposed in the vertical direction. Weighting factors $W_1$ to $W_4$ and $W_5$ to $W_8$ used by two TXRUs in the vertical direction are different, and beams are generated in different directions. Eight sub arrays and TXRUs are disposed in the horizontal direction (column direction). These eight TXRUs in the horizontal direction use the same weighting matrix, and generate beams in the same direction.

(Wireless Communication Unit 220)

The wireless communication unit 220 transmits and receives signals. For example, the wireless communication unit 220 transmits a downlink signal to a terminal device and receives an uplink signal from a terminal device.

(Network Communication Unit 230)

The network communication unit 230 transmits and receives information. For example, the network communication unit 230 transmits information to another node and receives information from another node. The other node includes, for example, a core network and another base station. The other node includes the control entity 300 as an example.

(Storage Unit 240)

The storage unit 240 temporarily or permanently stores programs and data that are necessary for the operation of the base station 200.

(Processing Unit 250)

The processing unit 250 provides the various functions of the base station 200. The processing unit 250 includes an information acquisition unit 251 and a control unit 253. Note that the processing unit 250 can further include other components in addition to these components. That is, the processing unit 250 can perform other operations in addition to the operations of the components.

(Information Acquisition Unit 251)

The information acquisition unit 251 acquires information and programs for operation of the base station 200 and information received from other nodes. The information acquisition unit 251 can acquire information and programs for operation of the base station 200 from the storage unit 240.

In the present embodiment, the information acquisition unit 251 acquires the measurement report associated with the antenna port for reception strength of the reference signal from the terminal device 100 which is in a connected state for each of one or more antenna ports.

The information acquisition unit 251 acquires information (channel state report) transmitted from each terminal device 100 in accordance with a reference signal output from the antenna unit 210 in the present embodiment. The content of a channel state report transmitted from each terminal device 100 in accordance with a reference signal will be described below. Further, the information acquisition unit 251 acquires from the terminal device 100, a channel state report which reports states of channels at part of antenna ports among all the antenna ports for the beamformed reference signal from the base station 200.

(Control Unit 253)

The control unit 253 controls the operation of the base station 200. The control unit 253 outputs a reference signal from the antenna unit 210, for example, on a first beam generated with at least two or more different first weighting matrices (cell specific weighting matrices) in the present embodiment. Further, the control unit 253 generates a second weighting matrix (terminal specific weighting matrix) specific to each terminal device in accordance with information that is transmitted from each terminal device 100 in accordance with a reference signal output from the antenna unit 210 and acquired by the information acquisition unit 251. The control unit 253 then outputs data for each terminal device 100 from the antenna unit 210 on a second beam generated with the first weighting matrices and the second weighting matrix.

Further, the control unit 253 selects part of antenna ports among all the antenna ports for the beamformed reference signal, acquires from the terminal device 100, a channel state report which reports states of channels at the selected part of antenna ports, and executes processing for beamforming downlink data to the terminal device 100 from the antenna unit 210 using the antenna ports selected at the terminal device 100. Further, the control unit 253 notifies the terminal device 100 in the RRC_CONNECTED state of the CSI-RS configuration information beamformed by the base station 200 with a plurality of beams and the CSI-RS configuration information to be beamformed by the adjacent cell with a plurality of beams. The control unit 253 acquires the CSI-RS configuration information to be beamformed by the adjacent cell with a plurality of beams using, for example, an X2 interface.

The functional configuration example of the base station 200 according to an embodiment of the present disclosure has been described above. Next, a functional configuration example of the control entity 300 according to an embodiment of the present disclosure will be described.

(1.2.4. Configuration Example of Control Entity)

Figure 14:
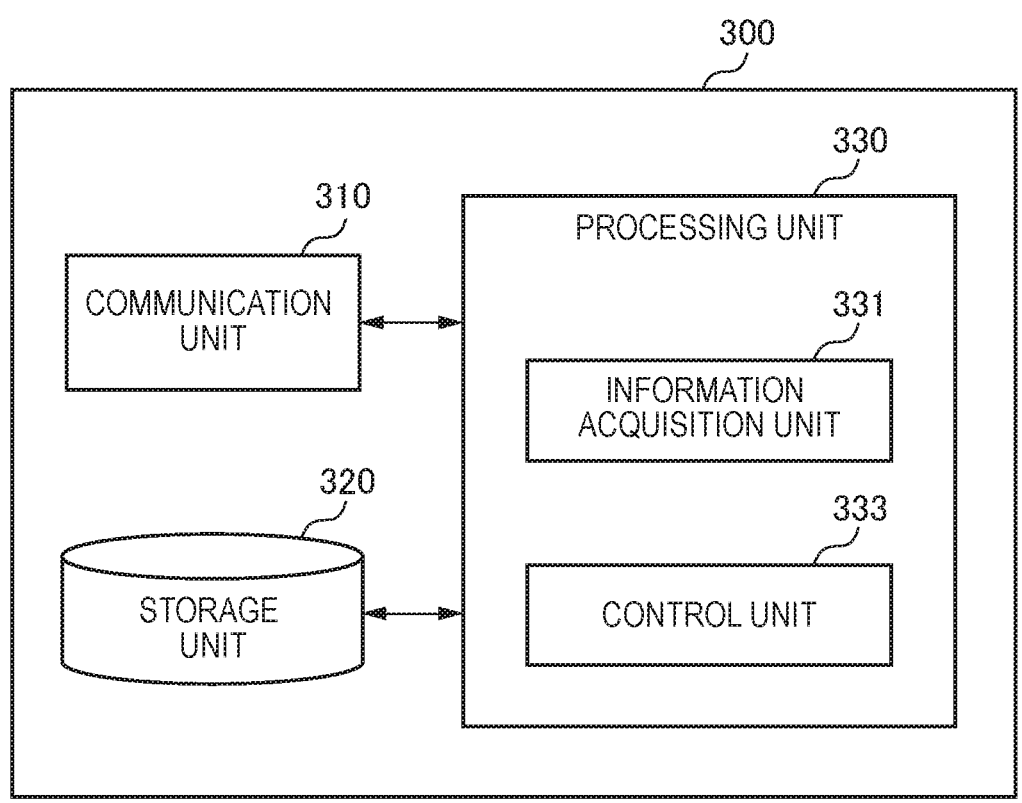
FIG. 14 is a block diagram illustrating a functional configuration example of a control entity 300 according to an embodiment of the present disclosure.

FIG. 14 is a block diagram illustrating a functional configuration example of the control entity 300 according to an embodiment of the present disclosure. As illustrated in FIG. 14, the control entity 300 according to the embodiment of the present disclosure includes a communication unit 310, a storage unit 320, and a processing unit 330.

(Communication Unit 310)

The communication unit 310 transmits and receives information. For example, the communication unit 310 transmits information to another node and receives information from another node. The other node includes, for example, a core network and a base station. The other node includes the base station 200 as an example.

(Storage Unit 320)

The storage unit 320 temporarily and permanently stores programs and data that are necessary for the operation of the control entity 300.

(Processing Unit 330)

The processing unit 330 provides the various functions of the control entity 300. The processing unit 330 includes an information acquisition unit 331 and a control unit 333. Note that the processing unit 330 can further include other components in addition to these components. That is, the processing unit 330 can perform other operations in addition to the operations of the components.

(Information Acquisition Unit 331)

The information acquisition unit 331 acquires information for the operation of the control entity 300 and information received from another node. The information acquisition unit 331 can acquire information and programs for the operation of the control entity 300 from the storage unit 320.

(Control Unit 333)

The control unit 333 controls the operation of the control entity 300. The control unit 333 can operate on the basis of information acquired by the information acquisition unit 331.

The functional configuration example of the control entity 300 according to an embodiment of the present disclosure has been described above. Next, an operation example of the communication system 1 according to an embodiment of the present disclosure will be described.

1.3. Operation Example

In the present embodiment, three methods will be proposed for making a notification of an interference beam (measurement target) from the base station to the terminal.
(Method 1) The base station notifies the terminal of a transmission mode for FD-MIMO and an antenna port of a CSI-RS of a cell specific beam to be used in a PDSCH. Notification of the transmission mode may be made every time allocation of a cell specific beam changes.
(Method 2) The base station notifies the terminal of an antenna port of a CSI-RS to be measured as an interference beam in a measurement configuration.
(Method 3) The terminal reports a measurement value for each antenna port for all antenna ports of CSI-RSs which the base station makes a notification in a CSI-RS configuration. For example, in the case where notification of a specific antenna port is not made in the measurement configuration, this operation may be performed.
(Method 1)

First, an example where the base station notifies the terminal of an antenna port of a CSI-RS of a cell specific beam to be used in a PDSCH in notification of the transmission mode will be described. Here, as illustrated in FIG. 15, a case will be described where the antenna unit 210 of the base station 200 is configured such that an antenna array configured with 8×8 antenna elements and 8 transceiver units (TXRUs) are disposed with analog fixed phase shifters put therebetween, and the base station 200 in which the antenna unit 210 is configured in this manner provides FD-MIMO.

Figure 15:
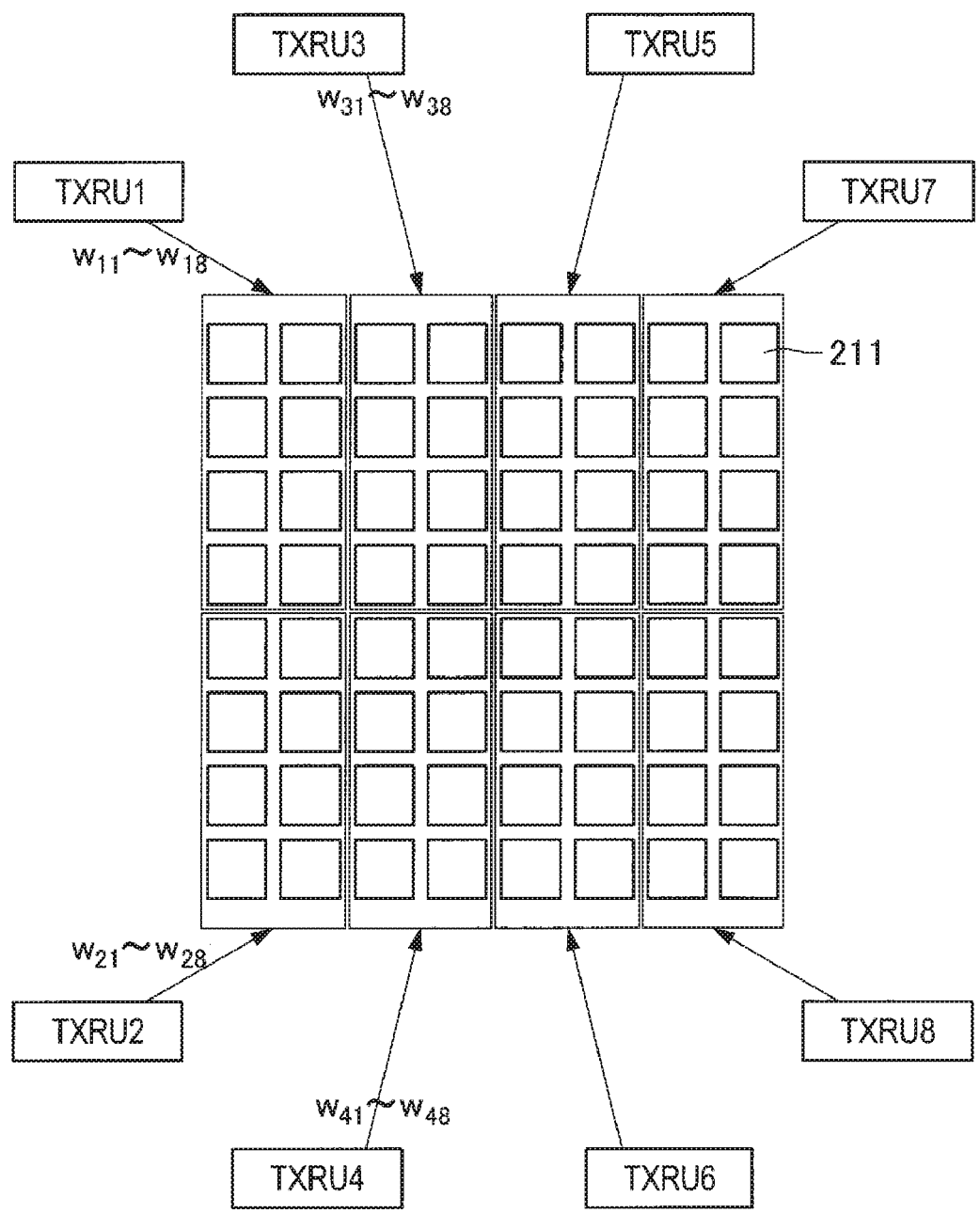
FIG. 15 is an explanatory diagram illustrating a configuration example of an antenna unit 210 of the base station 200.
Figure 16:
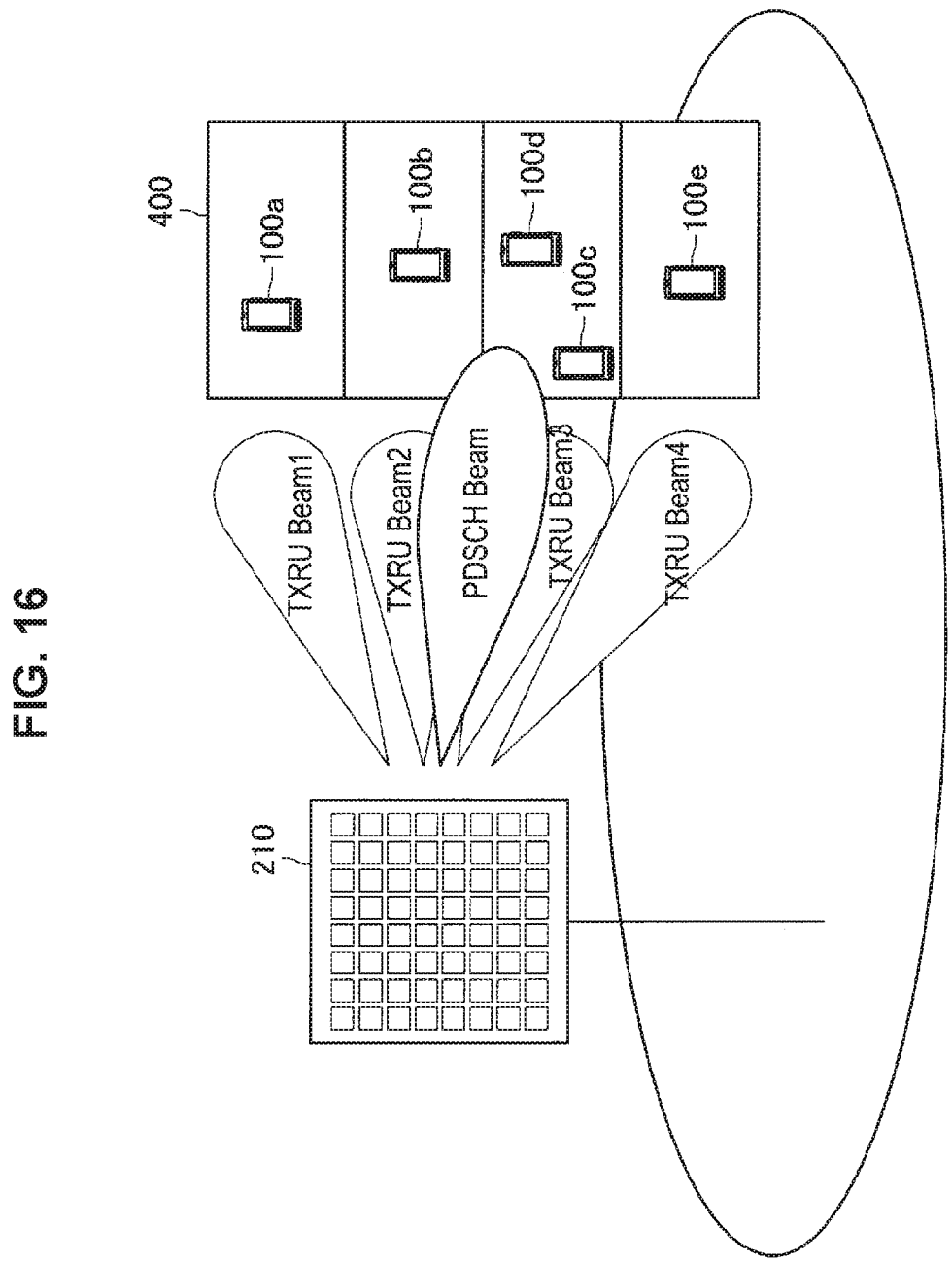
FIG. 16 is an explanatory diagram illustrating an example of a CSI-RS beam transmitted from the antenna unit 210 configured as illustrated in FIG. 15.

FIG. 16 is an explanatory diagram illustrating an example of a CSI-RS beam transmitted from the antenna unit 210 configured as illustrated in FIG. 15. FIG. 16 illustrates only four beams (TXRU Beams 1 to 4) among eight CSI-RS beams transmitted from eight TXRUs. The remaining four CSI-RS beams may be directed to other angles. Further, FIG. 16 also illustrates five terminal devices 100a to 100e located in the building 400.

The terminal device 100a is located at a position where the terminal device 100a can receive a CSI-RS beam 1, the terminal device 100b is located at a position where the terminal device 100b can receive a CSI-RS beam 2, the terminal device 100c and the terminal device 100d are located at positions where the terminal device 100c and the terminal device 100d can receive the CSI-RS beam 2 and a CSI-RS beam 3, and the terminal device 100e is located at a position where the terminal device 100e can receive a CSI-RS beam 4. For the terminal device 100a, the CSI-RS beam 2 can be interference, and, for the terminal device 100b, the CSI-RS beam 1 can be interference.

(Notification of CSI Reference Signal Configuration from Base Station to Terminal Device)

The base station 200 notifies a terminal which issues an RRC connection request of a CSI Reference Signal Configuration through RRC signaling. The CSI Reference Signal Configuration includes an antenna port to which a CSI-RS is to be transmitted, a position of a resource element into which a CSI-RS is to be inserted, information relating to a sub-frame into which a CSI-RS is to be inserted, or the like. In this method 1, it is assumed that the number of antenna ports forming a beamformed CSI-RS is eight.

For example, it is assumed that antenna ports from which the CSI-RS beam 1 to the CSI-RS beam 8 are to be transmitted are respectively antenna ports 15 to 22. Then, for example, resource element positions (k, l) to be used for a CSI-RS by the antenna ports 15 to 22 which make a notification of CSI reference Signal configuration 0 and which is specified in 3GPP TS36.211 table 6.10.5.2-1, or the like, become respectively, (9, 5), (9, 5), (3, 5), (3, 5), (8, 5), (8, 5), (2, 5), (2, 5) on even-numbered slots.

(Notification of Measurement Configuration from Base Station to Terminal Device)

Further, the base station 200 notifies a terminal which issues an RRC connection request of a measurement configuration through RRC signaling. The measurement configuration includes Measurement Objects indicating a measurement target, a triggering mechanism of whether Event driven (A1-A6) or periodic (expiration of a timer), Reporting configurations indicating designation of RSRP, RSRQ, Measurement Identities associating Measurement Objects with reporting configurations, or the like.

(Notification of Measurement Configuration from Base Station to Terminal Device)

The base station 200 designates CSI reference signal received power (CSI-RSRP) of the beamformed CSI-RS to the terminal device 100 which supports FD-MIMO as a measurement target of the measurement configuration. The base station 200 includes information relating to the beamformed CSI-RS in the CSI Reference Signal Configuration. In the method 1, CSI-RSRP of the beamformed CSI-RS and CSI-RSRQ which will be described later are designated as the measurement target in addition to the RSRP and the RSRQ of a serving cell, and a triggering mechanism of Event driven is designated.

(Measurement and Report of Terminal)

The terminal device 100 which supports FD-MIMO determines a location of a resource of the beamformed CSI-RS from the CSI Reference Signal Configuration and regularly measures reception strength.

For example, the terminal device 100a in FIG. 16 notifies the base station 200 of a measurement report by being triggered by CSI-RSRP of part of beamformed CSI-RS of a plurality of antenna ports becoming larger than RSRP of a CRS of a serving cell. The base station 200 can judge that it is appropriate to allocate a beam to a PDSCH of the terminal device 100a by the measurement report from the terminal device 100a. After this judgment, the base station 200 may request for a channel state report to the terminal device 100a and specify an antenna port of a beam to be allocated and a weighting matrix.

(Measurement and Report of Terminal Device Which is Made to Support FD-MIMO)

The terminal device 100 which supports FD-MIMO may include information of an antenna port and a measurement value for each antenna port in, for example, the measurement report. The terminal device 100a in FIG. 16 notifies the base station 200 of the measurement report by being triggered by the CSI-RSRP of the CSI-RS beam 1 becoming larger than the RSRP of the CRS of the serving cell. The terminal device 100a includes CSI-RSRP of each of all (in the example of this method 1, eight) antenna ports of the beamformed CSI-RS in the measurement report. The base station 200 can efficiently judge that it is appropriate to allocate the beam 1 to the PDSCH of the terminal device 100a by the measurement report from the terminal device 100a without requesting for the channel state report.

(Terminal Device is Notified of Antenna Port of CSI-RS of Cell Specific Beam to be used in PDSCH along with Transmission Mode for FD-MIMO)

The base station 200 notifies the terminal device 100 in an RRC connected state of a transmission mode (TM) through RRC signaling. Table 3 is a table indicating an example of transmission modes to which TM 11 is added for FD-MIMO.

TABLE 3

(Example of transmission mode)

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0: otherwise transmit diversity |
| 8 | If the UE is configured without PMI/RI reporting: if the number of PBCH antenna ports is one, single-antenna port, port 0: otherwise transmit diversity<br>If the UE is configured with PMI/RI reporting: closed-loop spatial multiplexing |
| 9 | If the UE is configured without PMI/RI reporting: if the number of PBCH antenna ports is one, single-antenna port, port 0: otherwise transmit diversity<br>If the UE is configured with PMI/RI reporting: if the number of CSI-RS ports is one, single-antenna port, port 7: otherwise up to 8 layer transmission, ports 7-14 (see subclause 7.1.5B) |
| 10 | If a CSI process of the UE is configured without PMI/RI reporting: if the number of CSI-RS ports is one, single-antenna port, port7: otherwise transmit diversity<br>If a CSI process of the UE is configured with PMI/RI reporting: if the number of CSI-RS ports is one, single-antenna port, port 7: otherwise up to 8 layer transmission, ports 7-14 (see subclause 7.1.5B) |
| 11 | FD-MIMO |

In the case where the base station 200 provides a PDSCH to a terminal device (referred to as a legacy terminal) which does not support FD-MIMO through beamforming, the base station 200 makes a notification of transmission modes (such as, for example, TM 7, 8, 9) for beamforming. On the other hand, in the case where the base station 200 provides a PDSCH to the terminal device 100 which supports FD-MIMO through beamforming, the base station 200 notifies the terminal device 100 of a transmission mode (for example, TM 11) for FD-MIMO along with an antenna port of the CSI-RS of a cell specific beam to be used in the PDSCH as a notification of the transmission mode.

For example, the base station 200 notifies the terminal device 100a in FIG. 16 of the TM 11 as the transmission mode while notifying the terminal device 100a of the antenna port 15 as an antenna port for the CSI-RS, and transmits the PDSCH of the terminal device 100a using the CSI-RS beam 1. The terminal device 100a can know a cell specific beam allocated to the PDSCH and an antenna port of the cell specific beam which can be interference through notification of the antenna port for the CSI-RS from the base station 200 and can measure a beamformed CSI-RS of a beam which can be interference.

(Measurement and Report of Estimate Value of Interference Among Beams by Terminal Device)

The terminal device 100, for example, regularly measures reception strength of the beamformed CSI-RS of the cell specific beam for each antenna port and calculates an estimate value of interference among beams. This calculation is executed by, for example, the control unit 143. Then, the terminal device 100 reports the calculated estimate value of interference among beams to the base station 200. Because the terminal device 100 knows the cell specific beam allocated to the PDSCH and the antenna port of the cell specific beam which can be interference through report from the base station 200, the terminal device 100 can estimate interference among beams in the case where a resource block allocated to the terminal device 100 is used in the cell specific beam which can be interference by measuring the CSI-RS reception strength for each antenna port. Note that the terminal device 100 may measure the CSI-RS reception strength for each sub-band instead of measuring the CSI-RS reception strength of an entire bandwidth of a component carrier, and report the CSI-RS reception strength to the base station 200, so that the base station 200 can multiplex users as efficiently as possible by controlling interference for each sub-band, because millimeter waves use a wide band.

For example, CSI reference signal received Quality (CSI-RSRQ) is obtained as expressed with equation 2 as the estimate value of interference among beams from the CSI-RSRP of the cell specific beam allocated to the PDSCH of the terminal device 100 and the sum of CSI-RS power of cell specific beams other than the CSI-RSRP (CSI-IM-RSRP).

[Math. 2]

$$CSI\_RSRQ = \frac{CSI\_RSRP}{CSI\_RSRP + CSI\_IM\_RSRP} \quad \text{(equation 2)}$$

Here, the CSI-RSRP and the CSI-IM-RSRP are defined as average power per resource element of the CSI-RS in the entire band. While a position of the resource element with which the CSI-RS is to be transmitted is different in accordance with the antenna port, the CSI-RSRP and the CSI- IM-RSRP are defined as power on the resource element with which each CSI-RS is to be transmitted.

While, in equation 2, the sum of CSI-RS power of all the cell specific beams is set as a denominator of an amount of interference among beams (CSI-RSRQ), as another method, reception strength (received signal strength indicator; RSSI) of the entire band or average power per resource element in the entire band may be set as the denominator of the amount of interference among beams (CSI-RSRQ). Further, as still another method, the sum of average power (including noise other than the CSI-RS) per all resource elements allocated to the CSI-RS may be set as the denominator of the amount of interference among beams (CSI-RSRQ).

As the trigger event, for example, the following six events which have been defined in related art are used.
Event A1: Serving cell becomes better than a threshold
Event A2: Serving cell becomes worse than a threshold
Event A3: Neighbour cell becomes better than the serving cell by an offset
Event A4: Neighbour cell becomes better than a threshold
Event A5: Serving cell becomes worse than threshold 1 while neighboring cells becomes better than threshold 2
Event A6: Neighbour cell becomes better than a secondary cell by an offset The terminal device 100 measures the measurement target and, when the acquired measurement result satisfies, for example, the above-described conditions for the trigger event, transmits the measurement report to the base station 200. Examples of the measurement target can include CSI-RSRP and CSI-RSRQ of the CSI-RS indicated in the CSI Reference Signal Configuration and CSI-IM-RSRP of the CSI-RS transmitted from an adjacent cell in addition to the RSRP and the RSRQ of the CRS of the serving cell and the RSRP and the RSRQ of the CRS of the adjacent cell which have also existed in related art. In this method 1, an example of interference control through the measurement report using Event A2 in which the CSI-RSRQ of the CSI-RS is set as the measurement target of the serving cell will be described.

Event A2 is a trigger in the case where the measurement value of the serving cell is smaller than a threshold value. Entering condition and Leaving condition are defined as follows.

$$Ms+Hys<Thresh \quad \text{Inequality A2-1 (Entering Condition)}$$

$$Ms-Hys>Thresh \quad \text{Inequality A2-2 (Leaving Condition)}$$

In the above-described two equations, Ms indicates a measurement value of the serving cell. In a case of the method 1, Ms indicates CSI-RSRQ of the CSI-RS of the serving cell.

Further, Hys indicates hysteresis of this event.

Further, Thresh indicates a threshold value of this event.

Further, Ms indicates RSRP in units of dBm and indicates RSRQ in units of dB. Hys is indicated in units of dB. Thresh is indicated in the same units as those of Ms.

In the case where the CSI-RSRQ of the CSI-RS of the serving cell becomes smaller than a threshold value determined in advance (that is, in the case where the estimate value of interference among beams exceeds a predetermined threshold), the terminal device 100 notifies the base station 200 of the measurement report.

The measurement report notified from the terminal device 100 to the base station 200 includes, for example, a measurement report ID, the CSI-RSRQ of the CSI-RS as the measurement value of the serving cell, a CSI-RS configuration ID, or the like. The base station 200 can judge that the measurement report is a measurement report triggered by Event A2 from the measurement report ID notified from the terminal device 100. Then, the base station 200 can know that the terminal device 100 detects interference among beams for which CSI-RS configuration information is notified through the CSI-RS configuration ID because the CSI-RSRQ of the CSI-RS is reported as the measurement value of the serving cell.

The terminal device 100 may include, for example, information indicating antenna port numbers selected by the terminal device 100 in the measurement report. The information indicating the selected antenna port numbers may be a list of the antenna port numbers or may be a bit map corresponding to the antenna ports in which the selected antenna ports are indicated. By receiving the report of antenna ports of the CSI-RS which are the main cause of degrading the CSI-RSRQ from the terminal device 100, the base station 200 can control interference among beams by preventing resource blocks allocated to the terminal in a beam which can cause interference from being allocated to other terminals.

In the above-described example, an example has been described where a report is made when the trigger conditions are satisfied as a report timing. As another method, the terminal device 100 may regularly make a report to the base station 200 at a timing designated in the measurement configuration. Further, the terminal device 100 may make a report when there is change in allocation of beams, or may make a report when the transmission mode transitions to the transmission mode for FD-MIMO. Further, the terminal device 100 may make a report when there is a CQI report request from the base station 200.

In the above description, as the measurement of the estimate value of interference among beams, an example has been described where average power per resource element of the CSI-RS in the entire band is measured. As another method of measuring the estimate value of interference among beams, the terminal device 100 may perform measurement for each of some sub-bands instead of performing measurement of the entire sub-band of the component carrier and make a report. This sub-band may be the same segment as the sub-band used for CSI-RS channel state report. Because millimeter waves use a wide band, the base station 200 can multiplex users as efficiently as possible by controlling interference for each sub-band.

Figure 17:
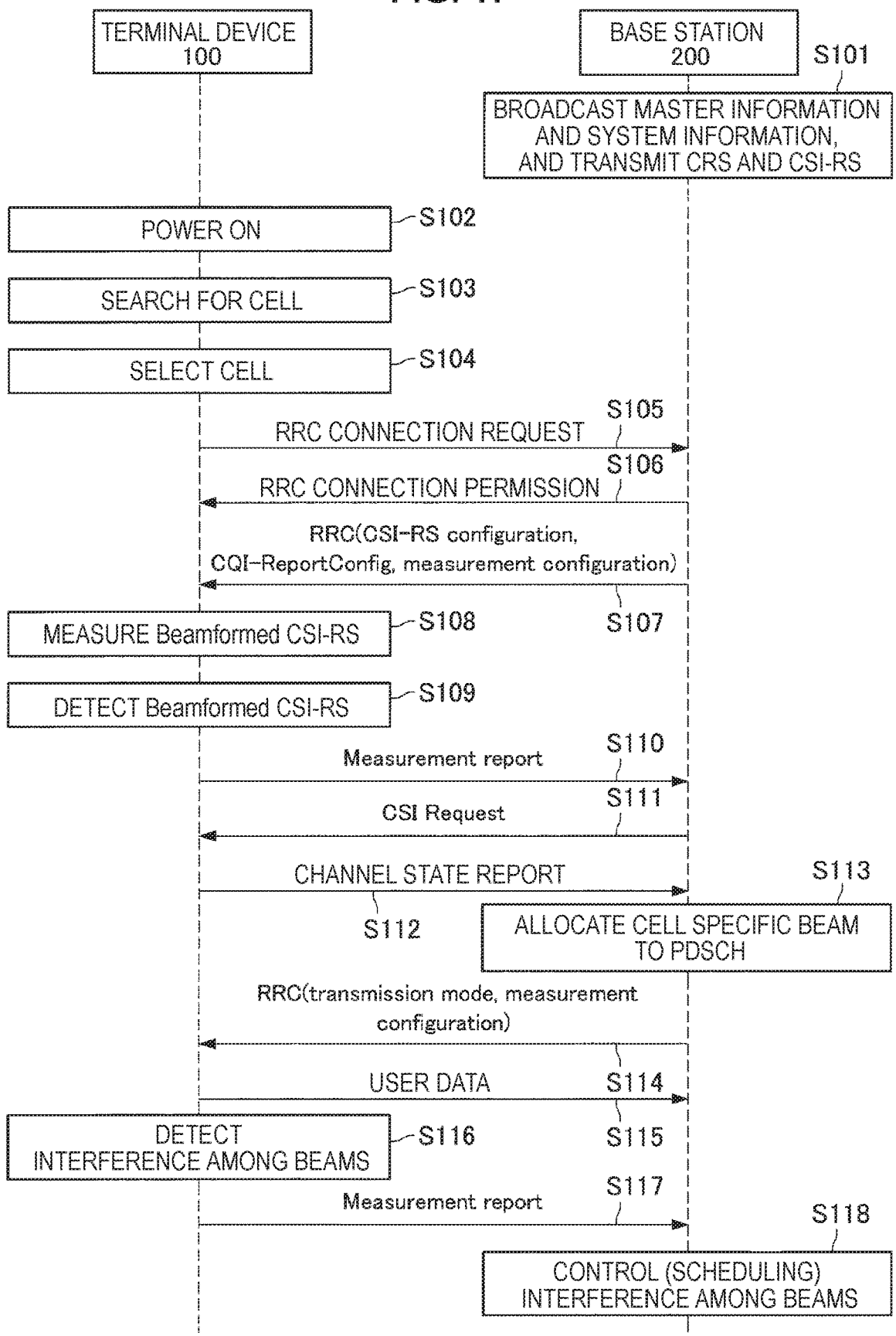
FIG. 17 is a flowchart illustrating operation examples of the terminal device 100 and the base station 200.

FIG. 17 is a flowchart illustrating operation examples of the terminal device 100 and the base station 200.

The base station 200 notifies the terminal device 100 of the master information and the system information while transmitting, from the antenna unit 210, cell specific reference signals (CRSs) with a resource element decided on the basis of physical layer cell IDs (PCIs) and the number of transmitting antennas in all the sub frames (step S101). Further, the base station 200 uses different antenna ports to transmit CSI-RSs through cell specific weighting matrices for each TXRU (step S101). The base station 200 transmits a CSI-RS at the predefined position of a resource element in a predefined sub frame.

If the terminal device 100 is powered on (step S102), the terminal device 100 conducts a cell search with a frequency channel having high priority (step S103). The terminal device 100 detects a first synchronization signal (PSS) and a second synchronization signal (SSS), and detects a physical layer cell ID (PCI) and frame timing. The terminal device 100 can decode a master information block (MIB) and a system information block (SIB), learn, from the already detected PCI and the number of transmitting antennas included in the base station 200, the position of a resource element into which a cell specific reference signal (CRS) is inserted, and measure the reception strength thereof. The terminal device 100 measures the strength of nearby CRSs with the control unit 143, and selects the optimum cell (step S104).

The terminal device 100 that selects the optimum cell sends an RRC connection request to the base station 200 (step S105). The control unit 143 transmits an RRC connection request in step S105 through the antenna unit 110. The base station 200 that receives the RRC connection request sends an RRC connection permission to the terminal device 100 (step S106). The control unit 253 transmits an RRC connection permission in step S106 through the antenna unit 210. If the base station 200 sends an RRC connection permission to the terminal device 100 that transmits an RRC connection request, the terminal device 100 and the base station 200 enter an RRC connection state (RRC Connected).

Subsequently, the base station 200 notifies the terminal device 100 which is put into an RRC connection state of a CSI-RS Configuration (CSI-RS configuration information), CQI-ReportConfig and a measurement configuration through RRC signaling (step S107). The notification in step S107 is made by the control unit 253 through the antenna unit 210.

The terminal device 100 which receives a notification from the base station 200, measures the beamformed CSI-RS (step S108) and detects the beamformed CSI-RS (step S109). The measurement in step S108 and the detection in step S109 are performed by the control unit 143.

Subsequently, the terminal device 100 transmits a measurement report of the beamformed CSI-RS to the base station 200 (step S110). The transmission of the measurement report in step S110 is performed by the control unit 143 through the antenna unit 110.

The base station 200 that received the measurement report from the terminal device 100 notifies the terminal device 100 of a CSI Request (step S111). The notification in step S111 is made by the control unit 253 through the antenna unit 210.

The terminal device 100 which receives a notification of the CSI Request from the base station 200 transmits a channel state report with respect to the CSI-RS to the base station 200 in response to the notification from the base station 200 (step S112). The transmission of the channel state report in step S112 is performed by the control unit 143 through the antenna unit 110.

The base station 200 which receives the channel state report from the terminal device 100 allocates a cell specific beam to the PDSCH (step S113) and makes a notification of the transmission mode and the measurement Configuration through RRC signaling (step S114). The allocation in step S113 is performed by the control unit 253. Further, the notification in step S114 is made by the control unit 253 through the antenna unit 210.

Subsequently, user data is exchanged between the base station 200 and the terminal device 100 (step S115), and, when the terminal device 100 detects interference among beams using the above-described method, or the like (step S116), the terminal device 100 transmits the measurement report to the base station 200 (step S117). The transmission of the measurement report in step S117 is performed by the control unit 143 through the antenna unit 110.

When the base station 200 receives report indicating that the interference among beams is detected from the terminal device 100, the base station 200 controls the interference among beams through scheduling (step S118). The interference among beams is controlled by the control unit 253.

(Method 2)

Subsequently, the second method will be described. This method 2 is a method in which the base station 200 indicates in the measurement configuration, an antenna port of the CSI-RS to be measured as an interference beam.

(Notification of CSI Reference Signal Configuration from Base Station to Terminal Device)

The base station 200 notifies a terminal which issues an RRC connection request of a CSI Reference Signal Configuration through RRC signaling. The CSI Reference Signal Configuration includes an antenna port to which a CSI-RS is to be transmitted, a position of a resource element into which a CSI-RS is to be inserted, information relating to a sub-frame into which a CSI-RS is to be inserted, or the like. In this method 2, it is assumed that the number of antenna ports forming a beamformed CSI-RS is eight.

For example, it is assumed that antenna ports from which the CSI-RS beam 1 to the CSI-RS beam 8 are to be transmitted are respectively antenna ports 15 to 22. Then, for example, resource element positions (k, l) to be used for a CSI-RS by the antenna ports 15 to 22 which make a notification of CSI reference Signal configuration 0 and which is specified in 3GPP TS36.211 table 6.10.5.2-1, or the like, become respectively, (9, 5), (9, 5), (3, 5), (3, 5), (8, 5), (8, 5), (2, 5), (2, 5) on even-numbered slots.

(Notification of Measurement Configuration From Base Station to Terminal Device)

Further, the base station 200 notifies a terminal which issues an RRC connection request of a measurement configuration through RRC signaling. The measurement configuration includes Measurement Objects indicating a measurement target, a triggering mechanism of whether Event driven (A1-A6) or periodic (expiration of a timer), Reporting configurations indicating designation of RSRP, RSRQ, Measurement Identities associating Measurement Objects with reporting configurations, or the like.

(Notification of Measurement Configuration Including Antenna Port Information of CSI-RS)

The base station 200 designates CSI reference signal received power (CSI-RSRP) of the beamformed CSI-RS to the terminal device 100 which supports FD-MIMO as a measurement target of the measurement configuration. The base station 200 includes information relating to the beamformed CSI-RS in the CSI Reference Signal Configuration. In the method 2, CSI-RSRP of the beamformed CSI-RS and CSI-RSRQ which will be described later are designated as the measurement target in addition to the RSRP and the RSRQ of a serving cell, and a triggering mechanism of Event driven is designated.

The base station 200 further notifies the terminal device 100 which supports FD-MIMO and in which a cell specific beam has already been allocated to the PDSCH, of the CSI-RSRP of the beamformed CSI-RS as the measurement target of the serving cell of the measurement configuration and information of the antenna port. In a case of the method 2, for example, the terminal device 100a in FIG. 16 detects the CSI-RS beam 1 and makes a notification of the measurement target of the serving cell after the CSI-RS beam 1 is allocated, including the information of the antenna port 15 using the measurement configuration. The base station 200 may make a notification of the antenna port numbers as the information of the antenna port or may indicate a bit map corresponding to the antenna ports. The base station 200 does not need to add the transmission mode for FD-MIMO indicated in the method 1 by making a notification of the measurement configuration including the antenna port information of the CSI-RS.

(Measurement and Report of Estimate Value of Interference Among Beams by Terminal Device)

The terminal device 100, for example, regularly measures reception strength of the beamformed CSI-RS of the cell specific beam for each antenna port and calculates an estimate value of interference among beams. Then, the terminal device 100 reports the calculated estimate value of interference among beams to the base station 200. Because the terminal device 100 knows the cell specific beam allocated to the PDSCH and the antenna port of the cell specific beam which can be interference through report from the base station 200, the terminal device 100 can estimate interference among beams in the case where a resource block allocated to the terminal device 100 is used in the cell specific beam which can be interference by measuring the CSI-RS reception strength for each antenna port. Note that the terminal device 100 may measure the CSI-RS reception strength for each sub-band instead of measuring the CSI-RS reception strength of an entire bandwidth of a component carrier, and report the CSI-RS reception strength to the base station 200, so that the base station 200 can multiplex users as efficiently as possible by controlling interference for each sub-band, because millimeter waves use a wide band.

For example, CSI reference signal received Quality (CSI-RSRQ) is obtained as expressed with equation 2 above as the estimate value of interference among beams from the CSI-RSRP of the cell specific beam allocated to the PDSCH of the terminal device 100 and the sum of CSI-RS power of cell specific beams other than the CSI-RSRP (CSI-IM-RSRP).

Here, the CSI-RSRP and the CSI-IM-RSRP are defined as average power per resource element of the CSI-RS in the entire band. While a position of the resource element with which the CSI-RS is to be transmitted is different in accordance with the antenna port, the CSI-RSRP and the CSI-IM-RSRP are defined as power on the resource element with which each CSI-RS is to be transmitted.

While, in equation 2, the sum of the CSI-RS power of all cell specific beams is set as the denominator of the amount of interference among beams (CSI-RSRQ), as another method, as another method, reception strength (RSSI) of the entire band may be set or average power per resource element in the entire band may be set. Further, as still another method, the sum of average power per all resource elements allocated to the CSI-RS (including noise other than the CSI-RS) may be set.

The terminal device 100 measures the measurement target and, when the acquired measurement result satisfies, for example, the above-described conditions for the trigger event in the method 1, transmits the measurement report to the base station 200. Examples of the measurement target can include CSI-RSRP and CSI-RSRQ of the CSI-RS indicated in the CSI Reference Signal Configuration and CSI-IM-RSRP of the CSI-RS transmitted from an adjacent cell in addition to the RSRP and the RSRQ of the CRS of the serving cell and the RSRP and the RSRQ of the CRS of the adjacent cell which have also existed in related art. In this method 2, an example of interference control through the measurement report using Event A2 in which the CSI-RSRQ of the CSI-RS is set as the measurement target of the serving cell will be described.

Event A2 is a trigger in the case where the measurement value of the serving cell is smaller than a threshold value. In the case where the CSI-RSRQ of the CSI-RS of the serving cell becomes smaller than a threshold value determined in advance, the terminal device 100 notifies the base station 200 of the measurement report.

The measurement report notified from the terminal device 100 to the base station 200 includes, for example, a measurement report ID, the CSI-RSRQ of the CSI-RS as the measurement value of the serving cell, a CSI-RS configuration ID, or the like. The base station 200 can judge that the measurement report is a measurement report triggered by Event A2 from the measurement report ID notified from the terminal device 100. Then, the base station 200 can know that the terminal device 100 detects interference among beams for which CSI-RS configuration information is notified through the CSI-RS configuration ID because the CSI-RSRQ of the CSI-RS is reported as the measurement value of the serving cell.

The terminal device 100 may include, for example, information indicating antenna port numbers selected by the terminal device 100 in the measurement report. The information indicating the selected antenna port numbers may be a list of the antenna port numbers or may be a bit map corresponding to the antenna ports in which the selected antenna ports are indicated. By receiving the report of antenna ports of the CSI-RS which are the main cause of degrading the CSI-RSRQ from the terminal device 100, the base station 200 can control interference among beams by preventing resource blocks allocated to the terminal in a beam which can cause interference from being allocated to other terminals.

In the above-described example, an example has been described where a report is made when the trigger conditions are satisfied as a report timing. As another method, the terminal device 100 may regularly make a report to the base station 200 at a timing designated in the measurement configuration. Further, the terminal device 100 may make a report when there is change in allocation of beams, or may make a report when the transmission mode transitions to the transmission mode for FD-MIMO. Further, the terminal device 100 may make a report when there is a CQI report request from the base station 200.

In the above description, as the measurement of the estimate value of interference among beams, an example has been described where average power per resource element of the CSI-RS in the entire band is measured. As another method of measuring the estimate value of interference among beams, the terminal device 100 may perform measurement for each of some sub-bands instead of performing measurement of the entire sub-band of the component carrier and make a report. This sub-band may be the same segment as the sub-band used for CSI-RS channel state report. Because millimeter waves use a wide band, the base station 200 can multiplex users as efficiently as possible by controlling interference for each sub-band.

(Method 3)

Subsequently, a third method will be described. The method 3 is a method in which a measurement value for each antenna port is reported for all antenna ports.

(Notification of CSI Reference Signal Configuration from Base Station to Terminal Device)

The base station 200 notifies a terminal which issues an RRC connection request of a CSI Reference Signal Configuration through RRC signaling. The CSI Reference Signal Configuration includes an antenna port to which a CSI-RS is to be transmitted, a position of a resource element into which a CSI-RS is to be inserted, information relating to a sub-frame into which a CSI-RS is to be inserted, or the like. In this method 3, it is assumed that the number of antenna ports forming a beamformed CSI-RS is eight.

For example, it is assumed that antenna ports from which the CSI-RS beam 1 to the CSI-RS beam 8 are to be transmitted are respectively antenna ports 15 to 22. Then, for example, resource element positions (k, l) to be used for a CSI-RS by the antenna ports 15 to 22 which make a notification of CSI reference Signal configuration 0 and which is specified in 3GPP TS36.211 table 6.10.5.2-1, or the like, become respectively, (9, 5), (9, 5), (3, 5), (3, 5), (8, 5), (8, 5), (2, 5), (2, 5) on even-numbered slots.

(Notification of Measurement Configuration From Base Station to Terminal Device)

Further, the base station 200 notifies a terminal which issues an RRC connection request of a measurement configuration through RRC signaling. The measurement configuration includes Measurement Objects indicating a measurement target, a triggering mechanism of whether Event driven (A1-A6) or periodic (expiration of a timer), Reporting configurations indicating designation of RSRP, RSRQ, Measurement Identities associating Measurement Objects with reporting configurations, or the like.

(Notification of Measurement Configuration Including Antenna Port Information of CSI-RS)

The base station 200 designates CSI reference signal received power (CSI-RSRP) of the beamformed CSI-RS to the terminal device 100 which supports FD-MIMO as a measurement target of the measurement configuration. The base station 200 includes information relating to the beamformed CSI-RS in the CSI Reference Signal Configuration. In the method 2, CSI-RSRP of the beamformed CSI-RS are designated as the measurement target in addition to the RSRP and the RSRQ of a serving cell, and a triggering mechanism of Event driven is designated.

(Measurement and Report of Estimate Value of Interference Among Beams by Terminal Device)

The terminal device 100, for example, regularly measures reception strength of the beamformed CSI-RS of the cell specific beam for each antenna port and calculates an estimate value of interference among beams. Then, the terminal device 100 reports the calculated estimate value of interference among beams to the base station 200. In the case where the terminal device 100 is not notified of the cell specific beam allocated to the PDSCH and the antenna port of the cell specific beam which can be interference, the terminal device 100 can estimate interference among beams in the case where the resource block allocated to the terminal device 100 is used in the cell specific beam which can be interference at the base station 200 by measuring and reporting the CSI-RS reception strength for all antenna ports. Note that the terminal device 100 may measure the CSI-RS reception strength for each sub-band instead of measuring the CSI-RS reception strength of an entire bandwidth of a component carrier, and report the CSI-RS reception strength to the base station 200, so that the base station 200 can multiplex users as efficiently as possible by controlling interference for each sub-band, because millimeter waves use a wide band.

Through the above-described three methods, the terminal device 100 can estimate occurrence of interference by a plurality of beams.

Figure 10:
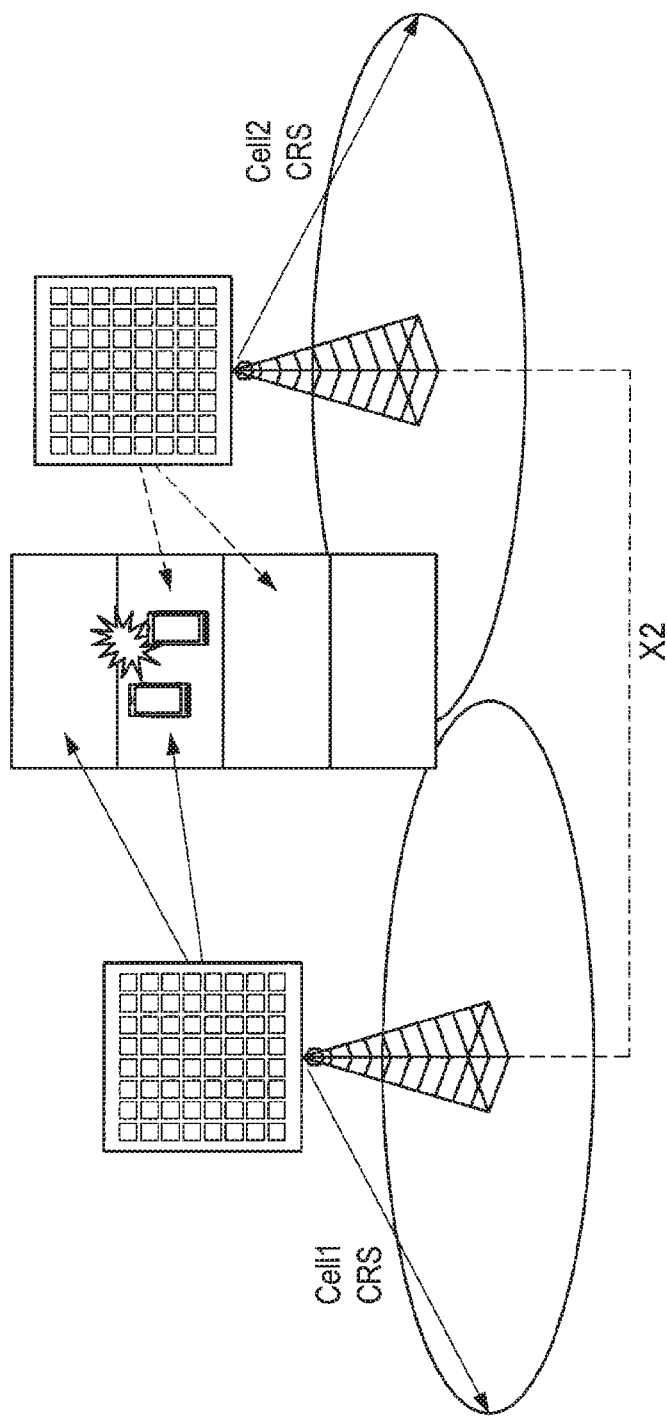
FIG. 10 is an explanatory diagram illustrating an example where beams of FD-MIMO are directed to the same building from a plurality of cells.

Subsequently, an example of control of interference between base stations will be described. It is assumed in FD-MIMO that beams are directed to upper floors of a building. FIG. 10 is an explanatory diagram illustrating an example where beams of FD-MIMO are directed to the same building from a plurality of cells. As illustrated in FIG. 10, in the case where beams of FD-MIMO of the same frequency are directed to the same building from a plurality of cells, if the same resource is used with the plurality of beams, large interference occurs. Therefore, in the case where the terminal device 100 which supports FD-MIMO detects other beams which can be interference from adjacent cells, the terminal device 100 reports a measurement value to the serving cell so as to adjust scheduling among cells so that the same resource is not used among beams which can cause interference.

(Notification of CSI Process From Base Station to Terminal)

The base station 200 notifies the terminal device 100 which supports FD-MIMO of the CSI process information through RRC signaling. The CSI process information includes configuration information of the beamformed CSI-RS (Non-zero Power CSI-RS configuration information) to be transmitted from the base station 200, configuration information of resources which are not to be used by the base station for transmission of the CSI-RS (Zero Power CSI-RS configuration information) and configuration information of the beamformed CSI-RS to be transmitted from the adjacent cell (CSI-IM configuration information).

When the terminal device 100 receives the CSI process information including the CSI-RS configuration information of the adjacent cell, the terminal device 100 regularly performs measurement on this CSI process, for example, and reports the measurement to the base station 200 in the case where conditions for a trigger event are satisfied. In the case where there are a plurality of adjacent cells which transmit the beamformed CSI-RS, the base station 200 may notify the terminal device 100 of a plurality of pieces of the CSI process information or may notify the terminal device 100 of one piece of the CSI process information in which information of a plurality of adjacent cells is integrated. Because a position and a beam which receives service are different depending on individual terminal devices 100, the CSI process information to be notified may be different for each terminal device 100.

Each of the Non-zero Power CSI-RS configuration information, the Zero Power CSI-RS configuration information and the CSI-IM configuration information includes an Antenna port count, a CSI reference Signal configuration, a Subframe configuration, a CSI-RS configuration ID, or the like. The Antenna port count indicates the number of antenna ports constituting the CSI-RS. The CSI reference Signal configuration is expressed with a value from 0 to 3, and a resource element (k, l) and a time slot used by the CSI-RS are determined from a Look-up table defined in 3GPP TS36.211 table 6.10.5.2-1, or the like. The Subframe configuration is expressed with a value from 0 to 154, and CSI-RS periodicity and CSI-RS subframe offset are provided from a Look-up table defined in 3GPP TS36.211 table 6.10.5.3-1. The CSI-RS configuration ID is used to identify CSI-RS configuration information.

(Notification of Measurement Configuration From Base Station to Terminal Device)

Further, the base station 200 notifies a terminal which issues an RRC connection request of a measurement configuration through RRC signaling. The measurement configuration includes Measurement Objects indicating a measurement target, a triggering mechanism of whether Event driven (A1-A6) or periodic (expiration of a timer), Reporting configurations indicating designation of RSRP, RSRQ, Measurement Identities associating Measurement Objects with reporting configurations, or the like.

(Notification of Measurement Configuration From Base Station to Terminal Device)

The base station 200 designates CSI reference signal received power (CSI-RSRP) of the beamformed CSI-RS to the terminal device 100 which supports FD-MIMO as a measurement target of the measurement configuration. The base station 200 includes information relating to the beamformed CSI-RS in the CSI Reference Signal Configuration. Here, CSI-RSRP of the beamformed CSI-RS and CSI-RSRQ which will be described later are designated as the measurement target in addition to the RSRP and the RSRQ of a serving cell, and a triggering mechanism of Event driven is designated.

(Terminal Device is Notified of Antenna Port of CSI-RS of Cell Specific Beam to be used in PDSCH Along with Transmission Mode for FD-MIMO)

The base station 200 notifies the terminal device 100 in an RRC connected state of a transmission mode (TM) through RRC signaling.

In the case where the base station 200 provides a PDSCH to a terminal device (referred to as a legacy terminal) which does not support FD-MIMO through beamforming, the base station 200 makes a notification of transmission modes (such as, for example, TM 7, 8, 9 of Table 3) for beamforming. On the other hand, in the case where the base station 200 provides a PDSCH to the terminal device 100 which supports FD-MIMO through beamforming, the base station 200 notifies the terminal device 100 of a transmission mode (for example, TM 11 of Table 3) for FD-MIMO along with an antenna port of the CSI-RS of a cell specific beam to be used in the PDSCH as a notification of the transmission mode.

For example, the base station 200 notifies the terminal device 100a in FIG. 16 of the TM 11 as the transmission mode while notifying the terminal device 100a of the antenna port 15 as an antenna port for the CSI-RS, and transmits the PDSCH of the terminal device 100a using the CSI-RS beam 1. The terminal device 100a can know a cell specific beam allocated to the PDSCH and an antenna port of the cell specific beam which can be interference through notification of the antenna port for the CSI-RS from the base station 200 and can measure a beamformed CSI-RS of a beam which can be interference.

(Measurement and Report of Estimate Value of Interference Among Beams by Terminal Device)

The terminal device 100, for example, regularly measures reception strength of the beamformed CSI-RS of the cell specific beam for each antenna port and calculates an estimate value of interference among beams. Then, the terminal device 100 reports the calculated estimate value of interference among beams to the base station 200. Because the terminal device 100 knows the cell specific beam allocated to the PDSCH and the antenna port of the cell specific beam which can be interference through report from the base station 200, the terminal device 100 can estimate interference among beams in the case where a resource block allocated to the terminal device 100 is used in the cell specific beam which can be interference by measuring the CSI-RS reception strength for each antenna port. Note that the terminal device 100 may measure the CSI-RS reception strength for each sub-band instead of measuring the CSI-RS reception strength of an entire bandwidth of a component carrier, and report the CSI-RS reception strength to the base station 200, so that the base station 200 can multiplex users as efficiently as possible by controlling interference for each sub-band, because millimeter waves use a wide band.

For example, CSI reference signal received Quality (CSI-RSRQ) is obtained as expressed with equation 2 above as the estimate value of interference among beams from the CSI-RSRP of the cell specific beam allocated to the PDSCH of the terminal device 100 and the sum of CSI-RS power of cell specific beams other than the CSI-RSRP (CSI-IM-RSRP).

In the case where the CSI process information includes the configuration information of the beamformed CSI-RS (CSI-IM configuration information) to be transmitted from an adjacent cell, the sum of CSI-RS power of all cell specific beams including the beamformed CSI-RS transmitted from the adjacent cell is set as the denominator of the amount of interference among beams (CSI-RSRQ). Note that the reception strength (RSSI) of the entire band or average power per resource element in the entire band may be set as the denominator of the amount of interference among beams (CSI-RSRQ). Further, the sum of average power (including noise other than the CSI-RS) per all resource elements allocated to the CSI-RS may be set as the denominator of the amount of interference among beams (CSI-RSRQ).

In the above description, as the measurement of the estimate value of interference among beams, an example has been described where average power per resource element of the CSI-RS in the entire band is measured. As another method of measuring the estimate value of interference among beams, the terminal device 100 may perform measurement for each of some sub-bands instead of performing measurement of the entire sub-band of the component carrier and make a report. This sub-band may be the same segment as the sub-band used for CSI-RS channel state report. Because millimeter waves use a wide band, the base station 200 can multiplex users as efficiently as possible by controlling interference for each sub-band.

(Transmission of Measurement Report From Terminal to Base Station)

In the case where the terminal device 100 measures a measurement target and the acquired measurement result satisfies, for example, conditions for a trigger event, the terminal device 100 transmits a measurement report to the base station 200. As the measurement target, in addition to RSRP and RSRQ of a CRS of a serving cell which have also existed in related art, and RSRP and RSRQ of a CRS of an adjacent cell, there can be CSI-RSRP and CSI-RSRQ of a CSI-RS indicated in the CSI reference signal configuration and CSI-IM-RSRP of a CSI-RS to be transmitted from the adjacent cell. Here, an example of interference control by a measurement report using Event A2 in which CSI-RSRQ of a CSI-RS is set as a measurement target of the serving cell will be described.

Event A2 is a trigger in the case where the measurement value of the serving cell is smaller than a threshold value. In the case where the CSI-RSRQ of the CSI-RS of the serving cell becomes smaller than a threshold value determined in advance, the terminal device 100 notifies the base station 200 of the measurement report.

The measurement report notified from the terminal device 100 to the base station 200 includes, for example, a measurement report ID, the CSI-RSRQ of the CSI-RS as the measurement value of the serving cell, a CSI-RS configuration ID, or the like. The base station 200 can judge that the measurement report is a measurement report triggered by Event A2 from the measurement report ID notified from the terminal device 100. Then, the base station 200 can know that the terminal device 100 detects interference among beams for which CSI-RS configuration information is notified through the CSI-RS configuration ID because the CSI-RSRQ of the CSI-RS is reported as the measurement value of the serving cell.

The terminal device 100 may include, for example, information indicating antenna port numbers selected by the terminal device 100 in the measurement report. The information indicating the selected antenna port numbers may be a list of the antenna port numbers or may be a bit map corresponding to the antenna ports in which the selected antenna ports are indicated. By receiving the report of antenna ports of the CSI-RS which are the main cause of degrading the CSI-RSRQ from the terminal device 100, the base station 200 can appropriately control interference beams of an adjacent cell.

(Processing of Controlling Interference Between Base Stations)

In this manner, the base station 200 can adjust scheduling by notification of interference control information using an X2 interface with an adjacent base station so that the same resource is not used between a downlink beam allocated to the terminal device 100 and a downlink beam of the adjacent cell for which interference is detected and which has the same frequency. Scheduling can be adjusted by, for example, the control unit 253. The interference control information may include a beam identifier (beam ID) which specifies a beam and antenna port information. Further, the interference control information may include sub-band information. By interference between base stations being controlled while a control target is limited to sub-band to which a terminal which reports interference among beams is scheduled, it is possible to use resources more efficiently.

2. Application Examples

The technology of the present disclosure can be applied to various products. For example, the control entity 300 may be realized as a server of any type such as a tower server, a rack server, a blade server, or the like. In addition, the control entity 300 may be a control module mounted in a server (e.g., an integrated circuit module configured in one die or a card or a blade inserted into a slot of a blade server).

Further, the base station 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 200 may be realized as another type of base station such as a node B or a base transceiver station (BTS). The base station 200 may include a main body that controls radio communication (also referred to as a base station device) and one or more remote radio heads (RRHs) disposed in a different place from the main body. In addition, various types of terminals to be described below may operate as the base station 200 by temporarily or semi-permanently executing the base station function.

In addition, the terminal device 100 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 100 may be realized as a terminal that performs machine-to-machine (M2M) communication (also referred to as a machine type communication (MTC) terminal). Furthermore, the terminal device 100 may be a wireless communication module mounted in such a terminal (for example, an integrated circuit module configured in one die).

2-1. Application Example with Regard to Control Entity

Figure 18:
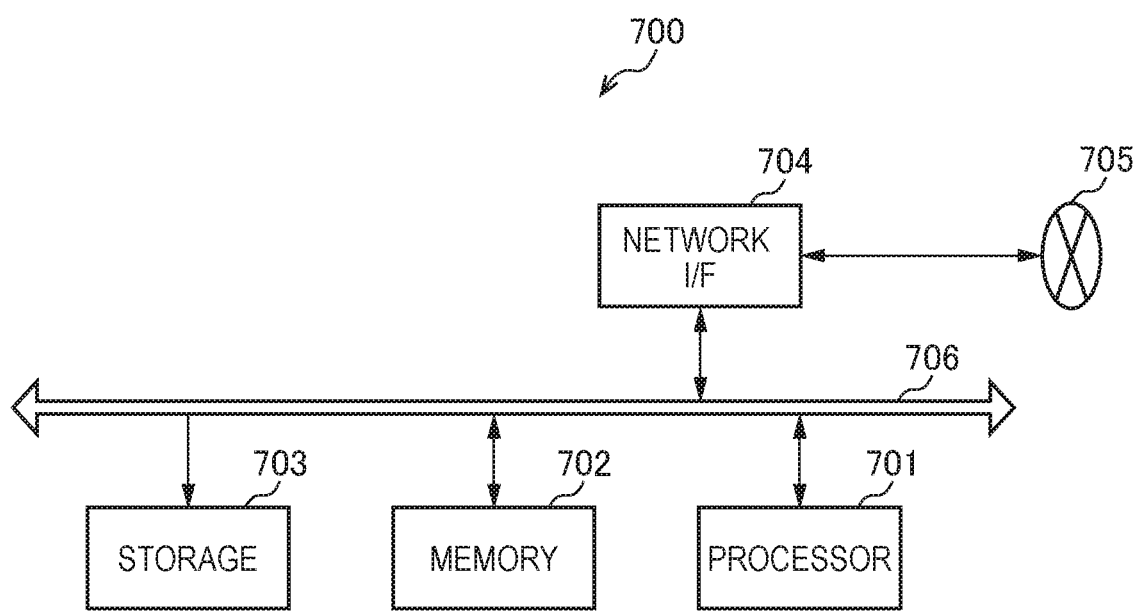
FIG. 18 is a block diagram illustrating an example of a schematic configuration of a server 700 to which the technology of the present disclosure can be applied.

FIG. 18 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 18, one or more constituent elements included in the processing unit 330 described with reference to FIG. 14 (the information acquisition unit 331 and/or the control unit 333) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

2-2. Application Example With Regard to Base Station

First Application Example

Figure 19:
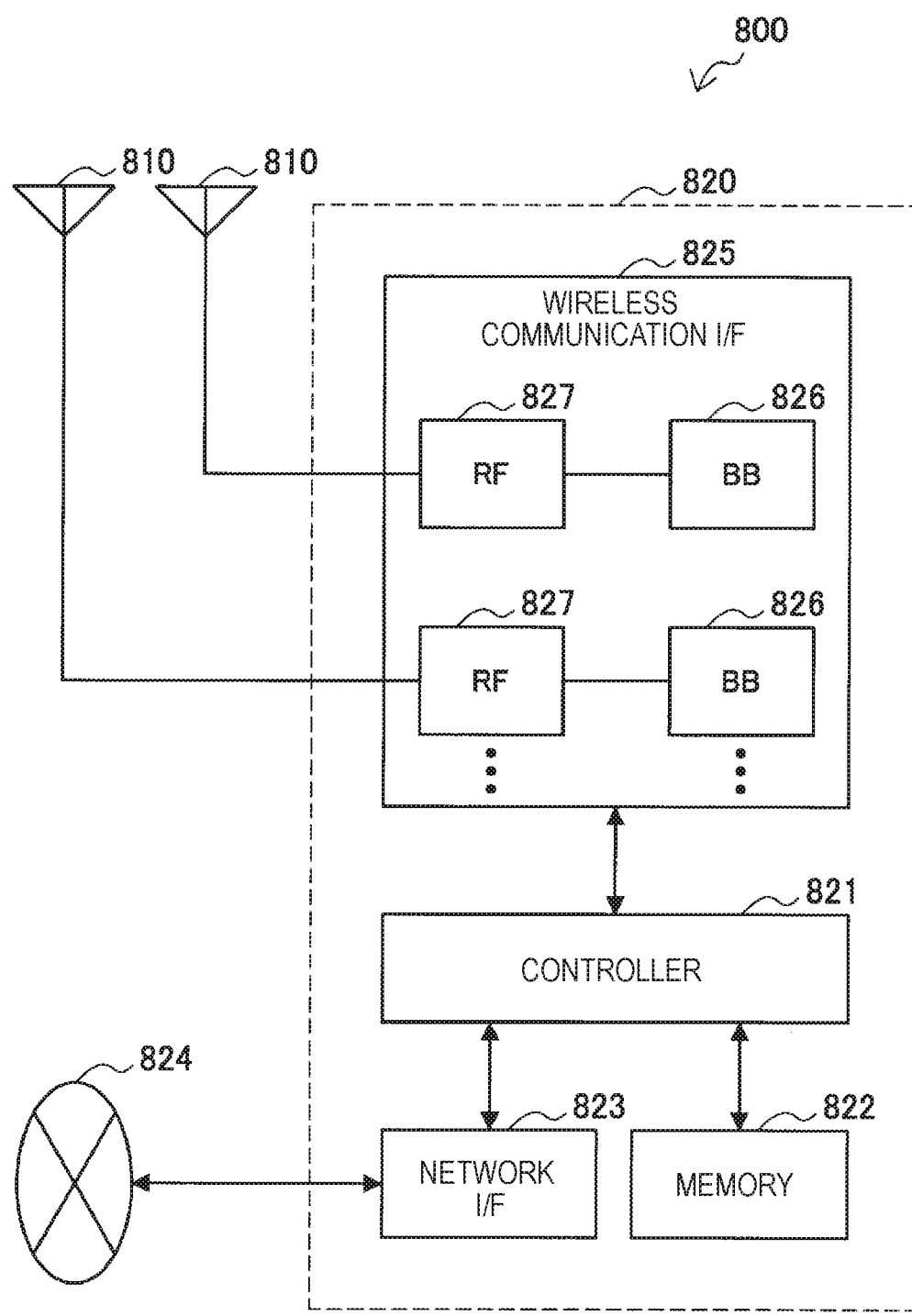
FIG. 19 is a block diagram illustrating a first example of a schematic configuration of an eNB to which the technology of the present disclosure can be applied.

FIG. 19 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 19. For example, the multiple antennas 810 may be compatible with multiple frequency bands used by the eNB 800. Although FIG. 19 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. Si interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 19. For example, the multiple BB processors 826 may be compatible with multiple frequency bands used by the eNB 800. The wireless communication interface 825 may include the multiple RF circuits 827, as illustrated in FIG. 19. For example, the multiple RF circuits 827 may be compatible with multiple antenna elements. Although FIG. 19 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 20:
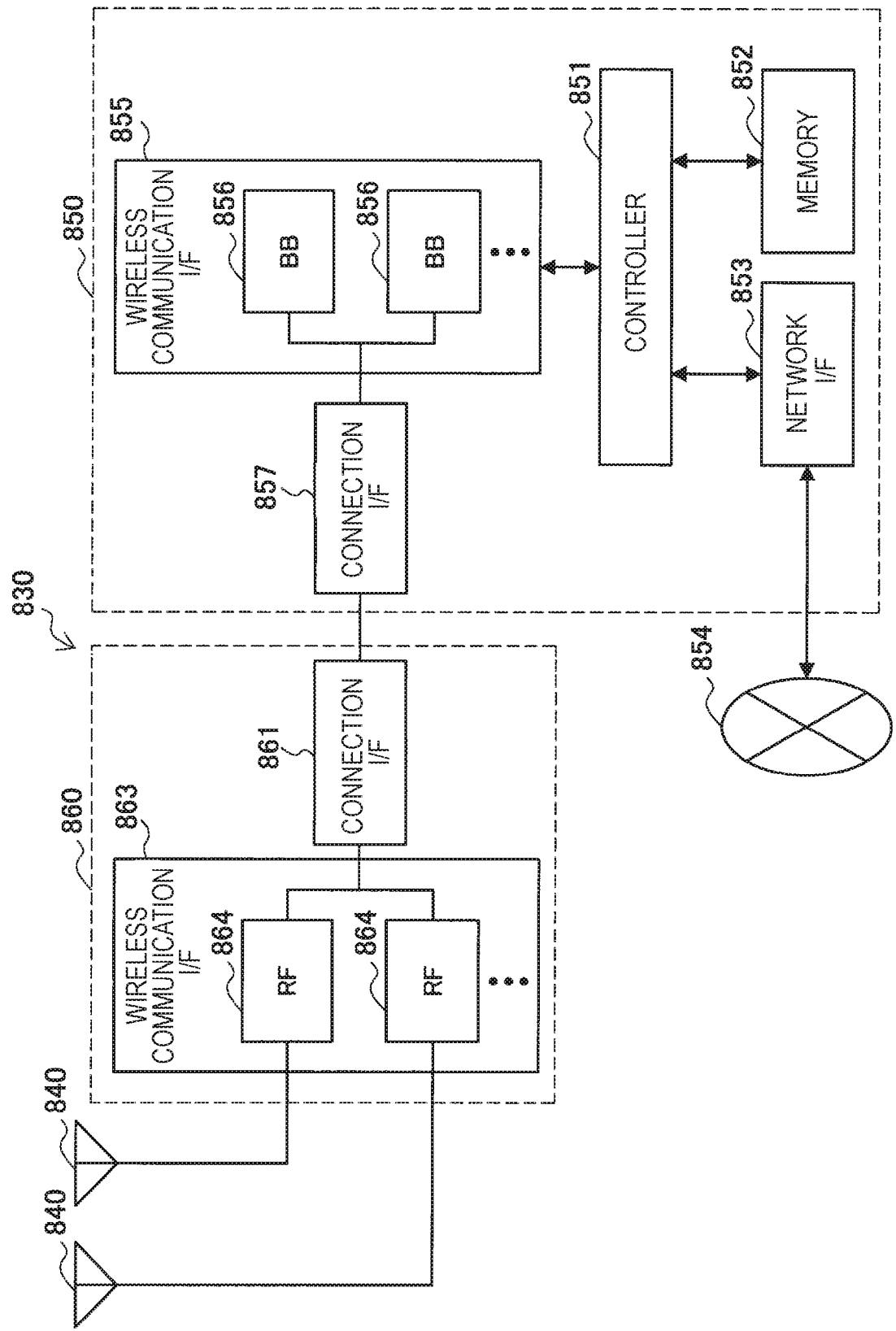
FIG. 20 is a block diagram illustrating a second example of the schematic configuration of the eNB to which the technology of the present disclosure can be applied.

FIG. 20 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 20. For example, the multiple antennas 840 may be compatible with multiple frequency bands used by the eNB 830. Although FIG. 20 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 19.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 19, except the BB processor 856 is connected to the RF circuit 864 of the RRH 860 via the connection interface 857. The wireless communication interface 855 may include the multiple BB processors 856, as illustrated in FIG. 20. For example, the multiple BB processors 856 may be compatible with multiple frequency bands used by the eNB 830. Although FIG. 20 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 20. For example, the multiple RF circuits 864 may support multiple antenna elements. Although FIG. 20 illustrates the example in which the wireless communication interface 863 includes the multiple RF circuits 864, the wireless communication interface 863 may also include a single RF circuit 864.

In the eNB 800 and the eNB 830 shown in FIGS. 19 and 20, one or more constituent elements included in the processing unit 250 (the information acquisition unit 251 and/or the control unit 253) described with reference to FIG. 13 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 20, the wireless communication unit 220 described, for example, with reference to FIG. 11 may be implemented by the wireless communication interface 863 (for example, the RF circuit 864). Moreover, the antenna unit 210 may be implemented by the antenna 840. Further, the network communication unit 230 may be implemented by the controller 851 and/or the network interface 853.

2-3. Application Example with Regard to Terminal Device

First Application Example

Figure 21:
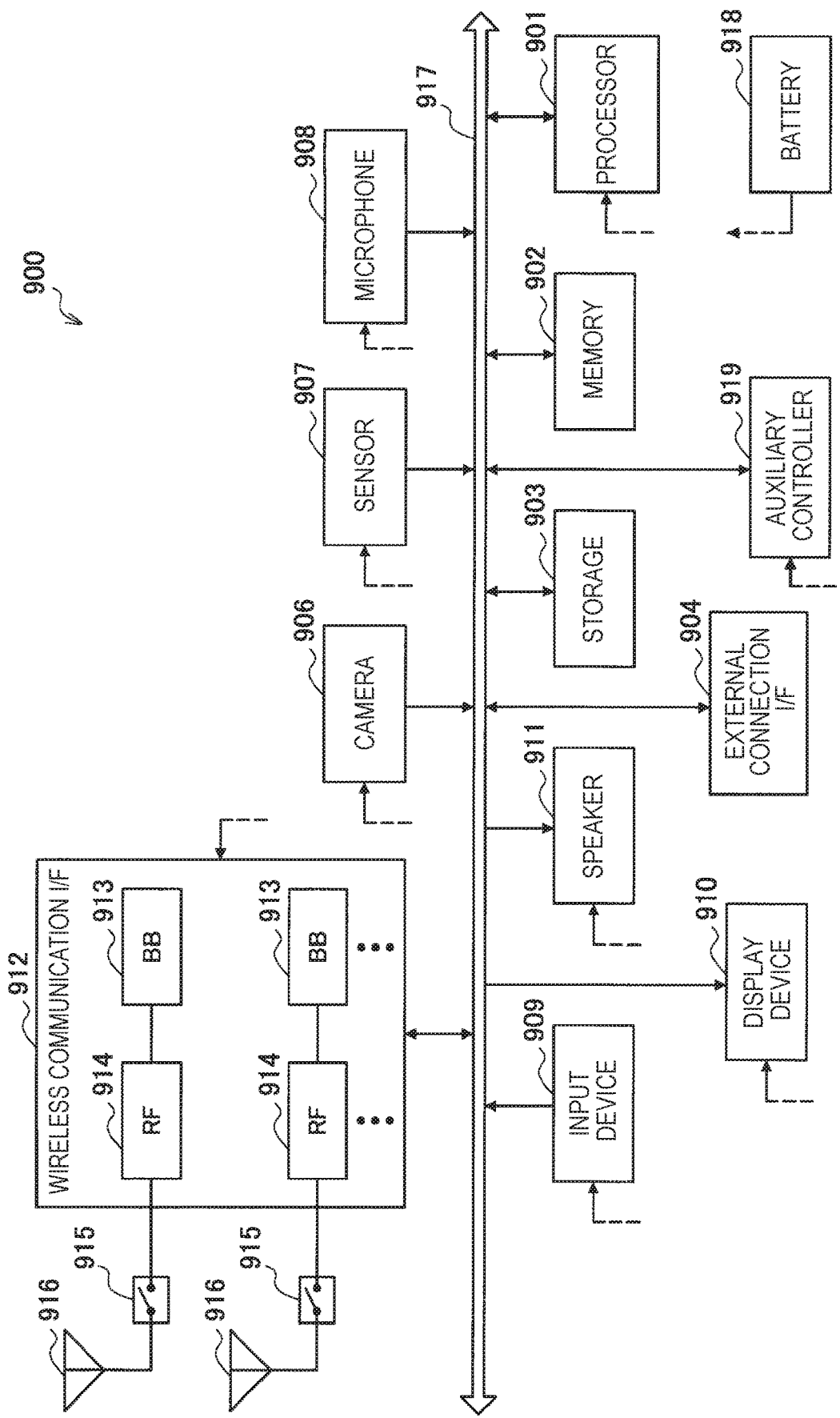
FIG. 21 is a block diagram illustrating an example of a schematic configuration of a smartphone 900 to which the technology of the present disclosure can be applied.

FIG. 21 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 21. Although FIG. 21 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 21. Although FIG. 21 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 21 via feeder lines, which are partially shown as dashed lines in the figure. The auxiliary controller 919 operates a minimum necessary function of the smartphone 900, for example, in a sleep mode.

In the smartphone 900 shown in FIG. 21, one or more constituent elements included in the processing unit 140 (the information acquisition unit 141 and/or the control unit 143) described with reference to FIG. 12 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 21, the wireless communication unit 120 described, for example, with reference to FIG. 10 may be implemented by the wireless communication interface 912 (for example, the RF circuit 914). Moreover, the antenna unit 110 may be implemented by the antenna 916.

Second Application Example

Figure 22:
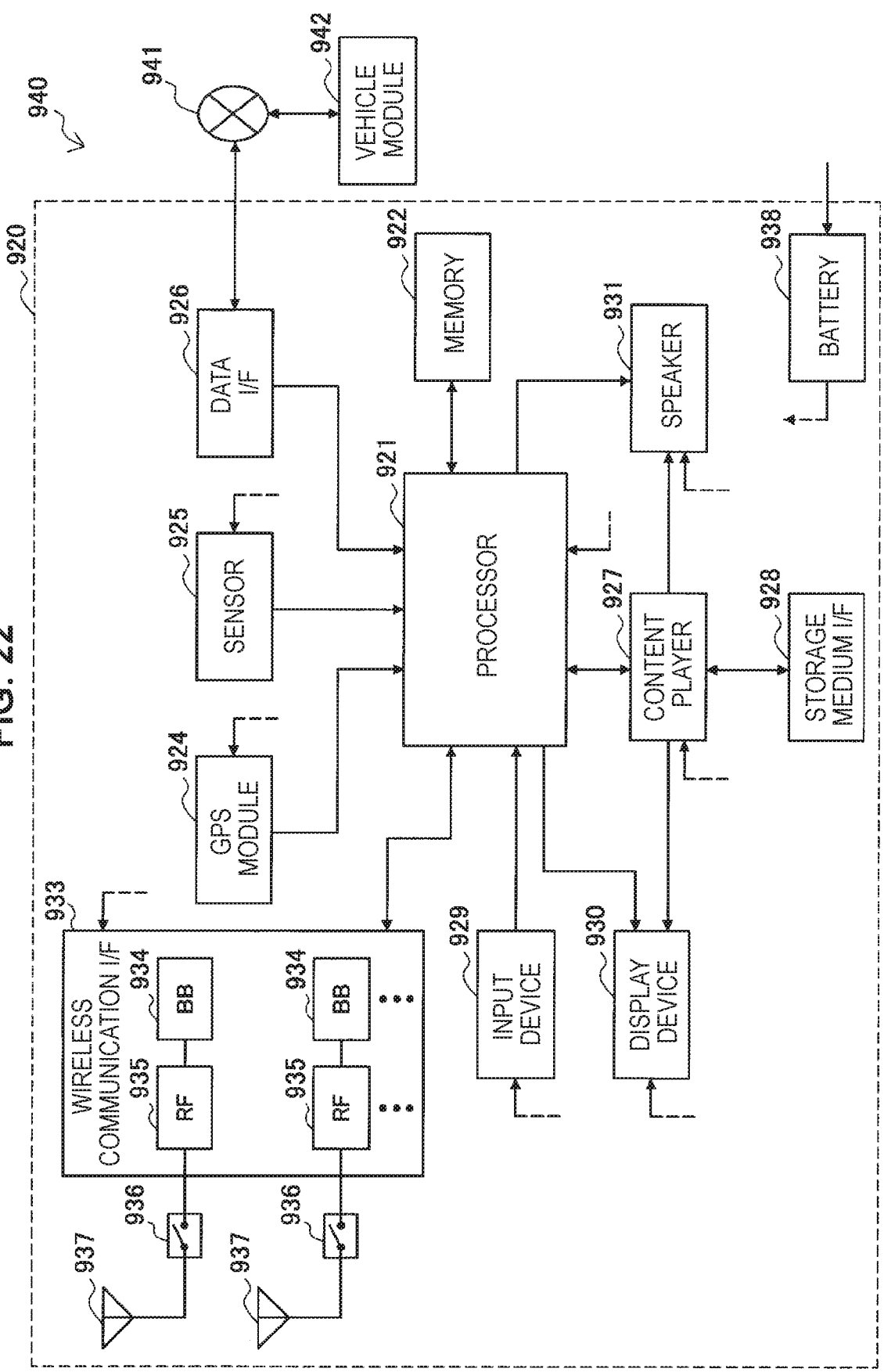
FIG. 22 is a block diagram illustrating an example of a schematic configuration of a car navigation device 920 to which the technology of the present disclosure can be applied.

FIG. 22 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 22. Although FIG. 22 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 22. Although FIG. 22 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 22 via feeder lines that are partially shown as dashed lines in the figure. The battery 938 accumulates power supplied form the vehicle.

In the car navigation device 920 shown in FIG. 22, one or more constituent elements included in the processing unit 140 (the information acquisition unit 141 and/or the control unit 143) described with reference to FIG. 12 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 22, the wireless communication unit 120 described with reference to FIG. 10, for example, may be implemented by the wireless communication interface 933 (for example, the RF circuit 935). Moreover, the antenna unit 110 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the one or more constituent elements included in the processing unit 140. The vehicle module 942 generates vehicle data such as vehicle speed, engine speed, and trouble information, and outputs the generated data to the in-vehicle network 941.

3. Conclusion

As described above, according to the embodiment of the present disclosure, it becomes possible to reduce interference among beams at the base station 200 and between the base stations 200 which perform FD-MIMO so that it is possible to optimize the number of users to be multiplexed.

According to the embodiment of the present disclosure, the base station 200 notifies the terminal device 100 of an antenna port of a cell specific beam to be allocated to the terminal device 100. The terminal device 100 can discern a cell specific beam which can be interference with the allocated cell specific beam, so that the terminal device 100 can estimate interference among beams. The terminal device 100 can then estimate interference among beams by measuring a beamformed CSI-RS.

According to the embodiment of the present disclosure, by notification of interference control information including a beam identifier being made between the base stations 200, it is possible to suppress interference among beams between the base stations 200. By notification of the interference control information including sub-band information being made between the base stations 200, the base station 200 can efficiently perform scheduling while suppressing interference among beams.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the example in which the control entity and the base station are different devices has been described, for example, the present disclosure is not limited thereto. For example, the control entity may be implemented in the base station.

In addition, for example, although the example in which the communication system complies with LTE or LTE-A has been described in the embodiment of the present disclosure, the present disclosure is not limited thereto. The communication system may be, for example, a system complying with another communication standard.

Further, MIMO communication according to an embodiment of the present disclosure may be multi-user MIMO or single-user MIMO.

In addition, processing steps in processes of the present specification may not necessarily be executed in a time series manner in the order described in the flowcharts or sequence diagrams. The processing steps in the processes may also be executed in, for example, a different order from the order described in the flowcharts or sequence diagrams, or may be executed in parallel.

Furthermore, a computer program for causing a processor (e.g., a CPU, a DSP, etc.) provided in a device (e.g., the terminal device, the base station, the control entity, or a module thereof) of the present specification to function as the device (i.e., a computer program for causing the processor to execute operations of constituent elements of the above-described device) can also be created. In addition, a recording medium in which the computer program is recorded may be provided. Moreover, a device that includes a memory storing the computer program and one or more processors that can execute the computer program (e.g., a finished product or a module for a finished product (a component, a processing circuit, a chip, or the like) may also be provided. In addition, a method including operations of one or more constituent elements of the device (e.g., the information acquisition unit and/or the control unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A terminal device including:

a control unit configured to make a measurement report associated with antenna ports, for reception strength of a weighted reference signal which is allocated to each of the antenna ports of a base station in a connected state and which is to be beamformed from the base station, for each of one or more antenna ports.

(2)

The terminal device according to (1), in which the control unit calculates an estimate value of interference among beams from reception strength of the reference signal of a specific beam of the base station allocated to a predetermined channel for a data signal and reception strength of another reference signal.

(3)

The terminal device according to (2), in which, in a case where the estimate value of interference among beams exceeds a predetermined threshold, the control unit transmits a measurement report including the estimate value of interference among beams to the base station.

(4)

The terminal device according to (2) or (3), in which the control unit makes a measurement report including the estimate value of interference among beams for each sub-band.

(5)

The terminal device according to any of (2) to (4), in which the control unit makes a measurement report including information of an antenna port selected upon reception of the reference signal.

(6)

The terminal device according to any of (1) to (5), in which the control unit makes a measurement report of the reception strength for each sub-band.

(7)

The terminal device according to any of (1) to (6), including: an acquisition unit configured to acquire information indicating that a transmission mode is a transmission mode for full-dimension MIMO (FD-MIMO) from the base station when a predetermined channel for a data signal is beamformed and transmitted from the base station.

(8)

The terminal device according to (7), in which the acquisition unit acquires the information indicating that the transmission mode is the transmission mode for FD-MIMO from the base station through radio resource control (RRC) signaling.

(9)

The terminal device according to any of (1) to (6), including:

an acquisition unit configured to acquire information of an antenna port of a beam allocated to a predetermined channel from the base station when a predetermined channel for the data signal is beamformed and transmitted from the base station.

(10)

The terminal device according to (9), in which the acquisition unit acquires the information of the antenna port from the base station through RRC signaling.

(11)

A wireless communication device including:

a transmitting unit configured to allocate a weighted reference signal to each of antenna ports, and beamform and transmit the allocated weighted reference signal; and an acquisition unit configured to acquire a measurement report associated with the antenna ports for reception strength of the reference signal from a terminal device in a connected state for each of the one or more antenna ports.

(12)

The wireless communication device according to (11), in which, when a predetermined channel for a data signal is beamformed and transmitted to a terminal device supporting FD-MIMO, the transmitting unit notifies the terminal device that a transmission mode is a transmission mode for FD-MIMO.

(13)

The wireless communication device according to (12), in which the transmitting unit notifies the terminal device that the transmission mode is the transmission mode for FD-MIMO through RRC signaling.

(14)

The wireless communication device according to (11), in which, when a predetermined channel for a data signal is beamformed and transmitted to a terminal device supporting FD-MIMO, the transmitting unit notifies the terminal device of information of an antenna port of a beam allocated to the predetermined channel.

(15)

The wireless communication device according to (14)

in which the transmitting unit makes a notification of the information of the antenna port for each of the terminal device through RRC signaling.

(16)

The wireless communication device according to any of (11) to (15), in which the acquisition unit acquires an estimate value of interference among beams from the terminal device, and the transmitting unit communicates information of scheduling with another base station on a basis of the estimate value of interference among beams.

(17)

The wireless communication device according to (16), in which the transmitting unit communicates information of a sub-band which becomes a target of scheduling.

(18)

The wireless communication device according to (16) or (17), in which the transmitting unit communicates information of a beam identifier which specifies a beam which becomes a target of scheduling.

(19)

The wireless communication device according to any of (16) to (18), in which the transmitting unit communicates information of an antenna port which transmits a beam which becomes a target of scheduling.

(20)

A communication method including:

making a measurement report associated with antenna ports, for reception strength of a weighted reference signal which is allocated to each of the antenna ports of a base station in a connected state and which is to be beamformed from the base station, for each of one or more antenna ports.

(21)

A communication method including:

allocating a weighted reference signal to each of antenna ports, and beamforming and transmitting the allocated weighted reference signal; and acquiring a measurement report associated with the antenna ports for reception strength of the reference signal from a terminal device in a connected state for each of the one or more antenna ports.

(22)

A computer program for causing a computer to execute:

making a measurement report associated with antenna ports, for reception strength of a weighted reference signal which is allocated to each of the antenna ports of a base station in a connected state and which is to be beamformed from the base station, for each of one or more antenna ports. (23)

A computer program for causing a computer to execute:
allocating a weighted reference signal to each of antenna ports, and beamforming and transmitting the allocated weighted reference signal; and
acquiring a measurement report associated with the antenna ports for reception strength of the reference signal from a terminal device in a connected state for each of the one or more antenna ports.

REFERENCE SIGNS LIST 1 communication system
100 terminal device
200 base station
300 control entity

The invention claimed is:
1. A terminal device, comprising:
a control unit configured to:
measure reception strength of a weighted reference signal of each of a plurality of antenna ports of a base station, wherein
the base station and the terminal device are in a connected state,
a plurality of beams is beamformed from the base station based on the weighted reference signal, and
the plurality of beams is associated with the plurality of antenna ports;
determine, for a specific antenna port of the plurality of antenna ports indicated by the base station, an estimate value of interference among the plurality of beams, based on the reception strength of the weighted reference signal of a first beam of the base station and the reception strength of the weighted reference signal of a second beam of the base station;
generate a measurement report that includes the determined estimate value of the interference, wherein the measurement report is associated with the plurality of antenna ports based on the measured reception strength of the weighted reference signal; and
transmit the measurement report to the base station; and
an acquisition unit configured to receive data on a specific beam, different from the plurality of beams, from the base station, wherein the base station:
generates the specific beam based on a terminal specific weighting matrix; and
generates the terminal specific weighting matrix based on the transmitted measurement report.
2. The terminal device according to claim 1, wherein the first beam is associated with a first antenna port of the plurality of antenna ports and the second beam is associated with a second antenna port of the plurality of antenna ports,
the plurality of beams includes the first beam and the second beam, and
the first beam is allocated to a channel for a data signal.
3. The terminal device according to claim 2, wherein the control unit is further configured to transmit the measurement report to the base station based on the estimate value of the interference that exceeds a determined threshold.

4. The terminal device according to claim 1, wherein the measurement report includes the estimate value of the interference for each sub-band of a plurality of sub-bands of the weighted reference signal.
5. The terminal device according to claim 1, wherein the control unit is further configured to:
receive the weighted reference signal from the base station; and
select an antenna port from the plurality of antenna ports based on the reception of the weighted reference signal, and
the measurement report includes information of the selected antenna port.
6. The terminal device according to claim 1, wherein the control unit is further configured to generate the measurement report of the reception strength of the weighted reference signal for each sub-band.
7. The terminal device according to claim 1, wherein
the base station transmits the beamformed plurality of beams through a channel for a data signal,
the acquisition unit is further configured to acquire specific information from the base station based on the transmission of the beamformed plurality of beams through the channel, and
the specific information indicates a transmission mode for full-dimension multi-input multi-output (FD-MIMO).
8. The terminal device according to claim 7, wherein the acquisition unit is further configured to acquire the specific information from the base station through radio resource control (RRC) signaling.
9. The terminal device according to claim 1, wherein
the acquisition unit is further configured to acquire, from the base station, information of the specific antenna port of the plurality of antenna ports based on transmission of the beamformed plurality of beams through a channel,
the specific antenna port is associated with a beam of the plurality of beams, and
the beam is allocated to the channel for a data signal.
10. The terminal device according to claim 9, wherein the acquisition unit is further configured to acquire the information of the specific antenna port from the base station through radio resource control (RRC) signaling.
11. A wireless communication device, comprising:
a transmitting unit configured to:
allocate a weighted reference signal to each of a plurality of antenna ports;
beamform a plurality of beams based on the weighted reference signal allocated to each of the plurality of antenna ports, wherein the plurality of beams is associated with the plurality of antenna ports; and
transmit the allocated weighted reference signal to a terminal device, wherein the wireless communication device and the terminal device are in a connection state; and
transmit data to the terminal device on a specific beam different from the plurality of beams;
an acquisition unit configured to acquire a measurement report from the terminal device, wherein the measurement report includes, for a specific antenna port of the plurality of antenna ports indicated by the wireless communication device, an estimate value of interference among the plurality of beams based on reception strength of the weighted reference signal of a first beam of the wireless communication device and reception strength of the weighted reference signal of a second beam of the wireless communication device; and a control unit configured to:
  generate a terminal specific weighting matrix based on the acquired measurement report; and
  generate the specific beam based on the terminal specific weighting matrix.

12. The wireless communication device according to claim 11, wherein the transmitting unit is further configured to:
  transmit the beamformed plurality of beams, through a channel for a data signal, to the terminal device, wherein the terminal device supports full-dimension multi-input multi-output (FD-MIMO); and
  notify the terminal device a transmission mode for the FD-MIMO, based on the transmission of the beamformed plurality of beams through the channel.

13. The wireless communication device according to claim 12, wherein the transmitting unit is further configured to notify the terminal device that the transmission mode is for the FD-MIMO through radio resource control (RRC) signaling.

14. The wireless communication device according to claim 11, wherein the transmitting unit is further configured to:
  transmit the beamformed plurality of beams, through a channel for a data signal, to the terminal device, wherein the terminal device supports full-dimension multi-input multi-output (FD-MIMO); and
  notify the terminal device of information of the specific antenna port of the plurality of antenna ports, wherein the specific antenna port is associated with a beam of the plurality of beams, and
  the beam is allocated to the channel.

15. The wireless communication device according to claim 14, wherein the transmitting unit is further configured to generate a notification of the information of the specific antenna port for the terminal device through radio resource control (RRC) signaling.

16. The wireless communication device according to claim 11, wherein
  the acquisition unit is further configured to acquire the estimate value, of the interference among the plurality of beams, from the terminal device, and
  the transmitting unit is further configured to communicate information of scheduling with a base station based on the estimate value of the interference among the plurality of beams.

17. The wireless communication device according to claim 16, wherein
  the transmitting unit is further configured to communicate information of a sub-band, and
  the sub-band is a target of the scheduling.

18. The wireless communication device according to claim 16, wherein
  the transmitting unit is further configured to communicate information of a beam identifier,
  the beam identifier specifies a third beam that is a target of the scheduling, and
  the third beam is different from the plurality of beams.

19. The wireless communication device according to claim 16, wherein
  the transmitting unit is further configured to communicate information of a determined antenna port, and
  the determined antenna port transmits a third beam that is a target of scheduling, and
  the third beam is different from the plurality of beams.

20. A communication method, comprising:
  in a wireless communication device:
    allocating a weighted reference signal to each of a plurality of antenna ports;
    beamforming a plurality of beams based on the weighted reference signal allocated to each of the plurality of antenna ports, wherein the plurality of beams is associated with the plurality of antenna ports;
    transmitting the allocated weighted reference signal to a terminal device, wherein the wireless communication device and the terminal device are in a connection state;
    acquiring a measurement report from the terminal device, wherein the measurement report includes, for a specific antenna port of the plurality of antenna ports indicated by the wireless communication device, an estimate value of interference among the plurality of beams based on reception strength of the weighted reference signal of a first beam of the wireless communication device and reception strength of the weighted reference signal of a second beam of the wireless communication device;
    generating a terminal specific weighting matrix based on the acquired measurement report;
    generating a specific beam based on the terminal specific weighting matrix; and
    transmitting data to the terminal device on the specific beam different from the plurality of beams.

* * * * *